(12) United States Patent
Yang et al.

(10) Patent No.: US 9,481,515 B2
(45) Date of Patent: Nov. 1, 2016

(54) TRASH CANS WITH FEATURES TO AID IN ACTUATION

(71) Applicant: simplehuman, LLC, Torrance, CA (US)

(72) Inventors: Frank Yang, Rancho Palos Verdes, CA (US); Joseph Sandor, Santa Ana Heights, CA (US)

(73) Assignee: simplehuman, LLC, Torrance, CA (US)

( * ) Notice: Subject to any disclaimer, the term of this patent is extended or adjusted under 35 U.S.C. 154(b) by 44 days.

(21) Appl. No.: 13/788,778

(22) Filed: Mar. 7, 2013

(65) Prior Publication Data

US 2013/0248532 A1   Sep. 26, 2013

Related U.S. Application Data

(60) Provisional application No. 61/609,179, filed on Mar. 9, 2012.

(51) Int. Cl.
| | | |
|---|---|---|
| *B65F 1/14* | (2006.01) | |
| *B23P 19/00* | (2006.01) | |
| *B65B 43/38* | (2006.01) | |
| *B65F 1/16* | (2006.01) | |

(52) U.S. Cl.
CPC ............... *B65F 1/1623* (2013.01); *B23P 19/00* (2013.01); *B65B 43/38* (2013.01); *B65F 1/1615* (2013.01); *B65F 1/1646* (2013.01); *B65F 2001/1661* (2013.01); *Y10T 29/49826* (2015.01)

(58) Field of Classification Search
CPC ........ B65D 43/26; B65F 1/16; B65F 1/1607; B65F 1/1615; B65F 1/1623; B65F 1/163; B65F 1/1646; B65F 2001/1669

USPC .............. 220/260, 262, 263, 264, 833, 908, 220/908.3; 29/428; 53/492
See application file for complete search history.

(56) References Cited

U.S. PATENT DOCUMENTS

| | | | |
|---|---|---|---|
| 830,182 A | * | 9/1906 | Skov .............................. 220/569 |
| 1,426,211 A | | 8/1922 | Pausin |
| 1,461,253 A | | 7/1923 | Owen |

(Continued)

FOREIGN PATENT DOCUMENTS

| | | |
|---|---|---|
| AU | 622536 | 4/1992 |
| AU | 365296 | 11/2015 |

(Continued)

OTHER PUBLICATIONS

U.S. Appl. No. 13/417,084, filed Jan. 20, 2012, Yang et al.

(Continued)

*Primary Examiner* — Fenn Mathew
*Assistant Examiner* — Madison L Poos
(74) *Attorney, Agent, or Firm* — Knobbe, Martens, Olson & Bear, LLP

(57) ABSTRACT

Certain embodiments of a trash can include a cap with a lid and an actuator. The actuator can extend outwardly from the cap at a downward angle. The actuator can be configured to maintain the lid in a closed position when a locking portion of the actuator is engaged with a securement portion of the lid. The lid can be rotationally biased toward an open position and the actuator can be configured to release the lid from the closed position upon an input of force on the actuator. The range of effective angles for the input force can enable a user of the trash can to easily open the lid by contacting the actuator with from a wide variety of angles.

30 Claims, 15 Drawing Sheets

(56) References Cited

U.S. PATENT DOCUMENTS

| | | |
|---|---|---|
| 1,754,802 A | 4/1930 | Raster |
| 1,820,555 A | 8/1931 | Buschman |
| 1,891,651 A | 12/1932 | Padelford et al. |
| 1,922,729 A | 8/1933 | Giebel |
| 1,980,938 A | 11/1934 | Geibel |
| 2,308,326 A | 1/1943 | Calcagno |
| D148,825 S | 2/1948 | Snider |
| 2,457,274 A | 12/1948 | Rifken |
| 2,759,625 A | 8/1956 | Ritter |
| 2,796,309 A | 6/1957 | Norris |
| 2,888,307 A | 5/1959 | Graves et al. |
| 2,946,474 A | 7/1960 | Knapp |
| 3,008,604 A | 11/1961 | Garner |
| 3,023,922 A | 3/1962 | Arrington et al. |
| 3,137,408 A | 6/1964 | Taylor |
| 3,300,082 A | 1/1967 | Patterson |
| 3,392,825 A | 7/1968 | Gale et al. |
| 3,451,453 A | 6/1969 | Heck |
| 3,654,534 A | 4/1972 | Fischer |
| 3,800,503 A | 4/1974 | Maki |
| 3,820,200 A | 6/1974 | Myers |
| 3,825,150 A | 7/1974 | Taylor |
| 3,825,215 A | 7/1974 | Borglum |
| 3,886,425 A | 5/1975 | Weiss |
| 3,888,406 A | 6/1975 | Nippes |
| 3,891,115 A | 6/1975 | Ono |
| 4,014,457 A | 3/1977 | Hodge |
| 4,027,774 A | 6/1977 | Cote |
| 4,081,105 A | 3/1978 | Dagonnet et al. |
| 4,189,808 A | 2/1980 | Brown |
| 4,200,197 A | 4/1980 | Meyer et al. |
| 4,217,616 A | 8/1980 | Jessup |
| 4,303,174 A | 12/1981 | Anderson |
| 4,320,851 A | 3/1982 | Montoya |
| 4,349,123 A | 9/1982 | Yang |
| 4,357,740 A | 11/1982 | Brown |
| 4,416,197 A | 11/1983 | Kehl |
| 4,417,669 A | 11/1983 | Knowles et al. |
| 4,457,483 A | 7/1984 | Gagne |
| 4,535,911 A | 8/1985 | Goulter |
| 4,570,304 A | 2/1986 | Montreuil et al. |
| 4,576,310 A | 3/1986 | Isgar et al. |
| D284,320 S | 6/1986 | Kubic et al. |
| 4,609,117 A | 9/1986 | Pamment |
| 4,630,332 A | 12/1986 | Bisbing |
| 4,630,752 A | 12/1986 | DeMars |
| 4,664,347 A | 5/1987 | Brown et al. |
| 4,697,312 A | 10/1987 | Freyer |
| 4,711,161 A | 12/1987 | Swin et al. |
| 4,729,490 A | 3/1988 | Ziegenbein |
| 4,753,367 A | 6/1988 | Miller et al. |
| 4,763,808 A | 8/1988 | Guhl et al. |
| 4,765,548 A | 8/1988 | Sing |
| 4,765,579 A | 8/1988 | Robbins et al. |
| 4,785,964 A | 11/1988 | Miller et al. |
| 4,792,039 A | 12/1988 | Dayton |
| 4,794,973 A | 1/1989 | Perisic |
| 4,813,592 A | 3/1989 | Stolzman |
| 4,823,979 A | 4/1989 | Clark, Jr. |
| 4,834,260 A | 5/1989 | Auten |
| 4,863,053 A | 9/1989 | Oberg |
| 4,867,339 A | 9/1989 | Hahn |
| 4,869,391 A | 9/1989 | Farrington |
| 4,884,717 A | 12/1989 | Bussard et al. |
| 4,892,223 A | 1/1990 | DeMent |
| 4,892,224 A | 1/1990 | Graham |
| 4,913,308 A | 4/1990 | Culbertson |
| 4,915,347 A | 4/1990 | Iqbal et al. |
| 4,918,568 A | 4/1990 | Stone et al. |
| D308,272 S | 5/1990 | Koepsell |
| 4,923,087 A | 5/1990 | Burrows |
| 4,944,419 A | 7/1990 | Chandler |
| 4,948,004 A | 8/1990 | Chich |
| 4,964,523 A | 10/1990 | Bieltvedt et al. |
| 4,972,966 A | 11/1990 | Craft, Jr. |
| 4,996,467 A | 2/1991 | Day |
| 5,031,793 A | 7/1991 | Chen et al. |
| 5,048,903 A | 9/1991 | Loblein |
| 5,054,724 A | 10/1991 | Hutcheson |
| 5,065,272 A | 11/1991 | Owen et al. |
| 5,065,891 A | 11/1991 | Casey |
| 5,076,462 A | 12/1991 | Perrone |
| D323,573 S | 1/1992 | Schneider |
| 5,090,585 A | 2/1992 | Power |
| 5,090,785 A | 2/1992 | Stamp |
| 5,100,087 A | 3/1992 | Ashby |
| 5,111,958 A | 5/1992 | Witthoeft |
| D327,760 S | 7/1992 | Donnelly |
| D329,929 S | 9/1992 | Knoedler et al. |
| 5,147,055 A | 9/1992 | Sampson et al. |
| 5,156,290 A | 10/1992 | Rodrigues |
| 5,170,904 A | 12/1992 | Neuhaus |
| 5,174,462 A | 12/1992 | Hames |
| D335,562 S | 5/1993 | Evans |
| 5,213,272 A | 5/1993 | Gallagher et al. |
| 5,222,704 A | 6/1993 | Light |
| D337,181 S | 7/1993 | Warman |
| 5,226,558 A | 7/1993 | Whitney et al. |
| 5,230,525 A | 7/1993 | Delmerico et al. |
| 5,242,074 A | 9/1993 | Conaway et al. |
| D340,333 S | 10/1993 | Duran et al. |
| 5,249,693 A | 10/1993 | Gillispie et al. |
| 5,261,553 A | 11/1993 | Mueller et al. |
| 5,265,511 A | 11/1993 | Itzov |
| 5,295,607 A | 3/1994 | Chang |
| 5,305,916 A | 4/1994 | Suzuki et al. |
| 5,314,151 A | 5/1994 | Carter-Mann |
| 5,322,179 A | 6/1994 | Ting |
| 5,329,212 A | 7/1994 | Feigleson |
| 5,348,222 A | 9/1994 | Patey |
| 5,353,950 A | 10/1994 | Taylor et al. |
| 5,372,272 A | 12/1994 | Jennings |
| 5,381,588 A | 1/1995 | Nelson |
| 5,385,258 A | 1/1995 | Sutherlin |
| 5,390,818 A | 2/1995 | LaBuda |
| 5,404,621 A | 4/1995 | Heinke |
| 5,407,089 A | 4/1995 | Bird et al. |
| 5,419,452 A | 5/1995 | Mueller et al. |
| 5,471,708 A | 12/1995 | Lynch |
| 5,474,201 A | 12/1995 | Liu |
| 5,501,358 A | 3/1996 | Hobday |
| 5,520,067 A | 5/1996 | Gabas |
| 5,520,303 A | 5/1996 | Bernstein et al. |
| 5,531,348 A | 7/1996 | Baker et al. |
| 5,535,913 A | 7/1996 | Asbach et al. |
| 5,558,254 A | 9/1996 | Anderson et al. |
| 5,584,412 A | 12/1996 | Wang |
| D377,554 S | 1/1997 | Adriaansen |
| 5,611,507 A | 3/1997 | Smith |
| 5,628,424 A | 5/1997 | Gola |
| 5,632,401 A | 5/1997 | Hurd |
| 5,636,416 A | 6/1997 | Anderson |
| 5,636,761 A | 6/1997 | Diamond et al. |
| 5,644,111 A | 7/1997 | Cerny et al. |
| 5,645,186 A | 7/1997 | Powers et al. |
| 5,650,680 A | 7/1997 | Chula |
| D383,277 S | 9/1997 | Peters |
| 5,662,235 A | 9/1997 | Nieto |
| 5,671,847 A | 9/1997 | Pedersen et al. |
| 5,690,247 A | 11/1997 | Boover |
| 5,695,088 A | 12/1997 | Kasbohm |
| 5,699,929 A | 12/1997 | Ouno |
| D388,922 S | 1/1998 | Peters |
| D389,631 S | 1/1998 | Peters |
| 5,704,511 A | 1/1998 | Kellams |
| 5,724,837 A | 3/1998 | Shin |
| 5,730,312 A | 3/1998 | Hung |
| 5,732,845 A | 3/1998 | Armaly, Jr. |
| 5,735,495 A | 4/1998 | Kubota |
| 5,738,239 A | 4/1998 | Triglia |
| 5,799,909 A | 9/1998 | Ziegler |
| 5,816,431 A | 10/1998 | Giannopoulos |
| 5,816,640 A | 10/1998 | Nishimura |
| D401,383 S | 11/1998 | Gish |

(56) References Cited

U.S. PATENT DOCUMENTS

| | | |
|---|---|---|
| D401,719 S | 11/1998 | Van Leeuwen et al. |
| 5,873,643 A | 2/1999 | Burgess, Jr. et al. |
| 5,881,896 A | 3/1999 | Presnell et al. |
| 5,881,901 A | 3/1999 | Hampton |
| 5,884,237 A | 3/1999 | Kanki et al. |
| 5,887,748 A | 3/1999 | Nguyen |
| 5,961,105 A | 10/1999 | Ehrnsberger et al. |
| 5,967,392 A | 10/1999 | Niemi et al. |
| 5,987,708 A | 11/1999 | Newton |
| 6,000,569 A | 12/1999 | Liu |
| 6,010,024 A | 1/2000 | Wang |
| 6,024,238 A | 2/2000 | Jaros |
| 6,036,050 A | 3/2000 | Ruane |
| 6,102,239 A | 8/2000 | Wien |
| 6,105,859 A | 8/2000 | Stafford |
| 6,123,215 A | 9/2000 | Windle |
| D431,700 S | 10/2000 | Roudebush |
| 6,126,031 A | 10/2000 | Reason |
| 6,129,233 A | 10/2000 | Schiller |
| 6,131,861 A | 10/2000 | Fortier, Jr. et al. |
| D435,951 S | 1/2001 | Yang et al. |
| 6,209,744 B1 | 4/2001 | Gill |
| 6,211,637 B1 | 4/2001 | Studer |
| 6,234,339 B1 | 5/2001 | Thomasd |
| 6,250,492 B1 | 6/2001 | Verbeek |
| D445,980 S | 7/2001 | Tjugum |
| 6,286,706 B1 | 9/2001 | Tucker |
| 6,328,320 B1 | 12/2001 | Walski et al. |
| 6,345,725 B1 | 2/2002 | Lin |
| 6,364,147 B1 | 4/2002 | Meinzinger et al. |
| 6,386,386 B1 | 5/2002 | George |
| 6,390,321 B1 | 5/2002 | Wang |
| 6,401,958 B1 | 6/2002 | Foss et al. |
| 6,519,130 B1 | 2/2003 | Breslow |
| 6,557,716 B1 | 5/2003 | Chan |
| D476,456 S | 6/2003 | Englert et al. |
| 6,596,983 B2 | 7/2003 | Brent |
| 6,626,316 B2 | 9/2003 | Yang |
| 6,626,317 B2 | 9/2003 | Pfiefer et al. |
| 6,632,064 B1 | 10/2003 | Walker et al. |
| D482,169 S | 11/2003 | Lin |
| 6,659,407 B2 | 12/2003 | Asaro |
| 6,681,950 B2 | 1/2004 | Miller, Jr. et al. |
| D488,604 S | 4/2004 | Yang et al. |
| D488,903 S | 4/2004 | Yang et al. |
| D489,503 S | 5/2004 | Lin |
| D489,857 S | 5/2004 | Yang et al. |
| D490,583 S | 5/2004 | Yang et al. |
| D490,954 S | 6/2004 | Brand |
| D491,706 S | 6/2004 | Yang et al. |
| 6,758,366 B2 | 7/2004 | Bourgund et al. |
| D493,930 S | 8/2004 | Wang |
| D494,723 S | 8/2004 | Lin |
| 6,812,655 B1 | 11/2004 | Wang et al. |
| 6,814,249 B2 | 11/2004 | Lin |
| D499,450 S | 12/2004 | Goodman et al. |
| 6,837,393 B1 | 1/2005 | Kuo |
| 6,857,538 B2 | 2/2005 | Lin |
| 6,859,005 B2 | 2/2005 | Boliver |
| D503,021 S | 3/2005 | Yang et al. |
| 6,866,826 B2 | 3/2005 | Moore et al. |
| 6,883,676 B2 | 4/2005 | Lin |
| D507,090 S | 7/2005 | Yang et al. |
| 6,920,994 B2 | 7/2005 | Lin |
| 6,974,948 B1 | 12/2005 | Brent |
| D513,445 S | 1/2006 | Lin |
| 6,981,606 B2 | 1/2006 | Yang et al. |
| D517,764 S | 3/2006 | Wang |
| D517,767 S | 3/2006 | Yang et al. |
| D518,266 S | 3/2006 | Yang et al. |
| 7,017,773 B2 | 3/2006 | Gruber et al. |
| 7,044,323 B2 | 5/2006 | Yang |
| D525,756 S | 7/2006 | Yang et al. |
| 7,073,677 B2 | 7/2006 | Richardson et al. |
| 7,077,283 B2 | 7/2006 | Yang et al. |
| 7,080,750 B2 | 7/2006 | Wein et al. |
| 7,086,550 B2 | 8/2006 | Yang et al. |
| D528,726 S | 9/2006 | Lin |
| 7,121,421 B2 | 10/2006 | Yang et al. |
| D531,499 S | 11/2006 | Zaidman |
| D535,799 S | 1/2007 | Epps |
| D535,800 S | 1/2007 | Yang et al. |
| 7,163,591 B2 | 1/2007 | Kim et al. |
| 7,168,591 B1 | 1/2007 | Miller |
| D537,223 S | 2/2007 | Lin |
| D537,599 S | 2/2007 | Lin |
| D537,601 S | 2/2007 | Lin |
| D537,999 S | 3/2007 | Lin |
| D538,995 S | 3/2007 | Lin |
| D539,498 S | 3/2007 | Yang et al. |
| D539,499 S | 3/2007 | Yang et al. |
| D540,001 S | 4/2007 | Zimmerman |
| D542,001 S | 5/2007 | Yang et al. |
| D542,995 S | 5/2007 | Lin |
| D543,673 S | 5/2007 | Yang et al. |
| D544,170 S | 6/2007 | Lin |
| D544,171 S | 6/2007 | Lin |
| D544,671 S | 6/2007 | Saunders et al. |
| D545,024 S | 6/2007 | Liao |
| 7,225,943 B2 | 6/2007 | Yang et al. |
| D547,020 S | 7/2007 | Chen |
| 7,243,811 B1 | 7/2007 | Ramsey |
| D550,918 S | 9/2007 | Wang et al. |
| D552,319 S | 10/2007 | Gusdorf |
| D552,321 S | 10/2007 | Yang et al. |
| D552,823 S | 10/2007 | Yang et al. |
| D552,824 S | 10/2007 | Zimmerman |
| D552,825 S | 10/2007 | Yang et al. |
| D555,320 S | 11/2007 | Yang et al. |
| D559,494 S | 1/2008 | Yang et al. |
| D559,495 S | 1/2008 | Yang et al. |
| D562,522 S | 2/2008 | Daams |
| 7,328,842 B2 | 2/2008 | Wagner et al. |
| D564,169 S | 3/2008 | Wang |
| D564,723 S | 3/2008 | Yang et al. |
| D566,367 S | 4/2008 | Lin |
| D566,369 S | 4/2008 | Shek |
| D566,923 S | 4/2008 | Lin |
| D567,468 S | 4/2008 | Yang et al. |
| D568,572 S | 5/2008 | Yang et al. |
| 7,374,060 B2 | 5/2008 | Yang et al. |
| D571,520 S | 6/2008 | Lin |
| 7,395,990 B1 | 7/2008 | Stevens |
| 7,398,913 B2 | 7/2008 | McClure |
| 7,404,499 B1 | 7/2008 | Ramsey |
| D574,569 S | 8/2008 | Yang et al. |
| D576,371 S | 9/2008 | Zimmerman |
| D578,265 S | 10/2008 | Presnell |
| D578,266 S | 10/2008 | Yang et al. |
| D578,268 S | 10/2008 | Yang et al. |
| D578,722 S | 10/2008 | Yang et al. |
| 7,438,199 B1 | 10/2008 | Tidrick |
| D580,120 S | 11/2008 | Lin |
| D580,613 S | 11/2008 | Yang et al. |
| D580,615 S | 11/2008 | Yang et al. |
| D581,622 S | 11/2008 | Presnell et al. |
| D584,470 S | 1/2009 | Bizzell et al. |
| D585,171 S | 1/2009 | Bizzell et al. |
| D585,618 S | 1/2009 | Yang et al. |
| D586,070 S | 2/2009 | Lin |
| 7,494,021 B2 | 2/2009 | Yang et al. |
| D587,874 S | 3/2009 | Lin |
| D593,271 S | 5/2009 | Yang et al. |
| 7,540,396 B2 | 6/2009 | Yang et al. |
| 7,543,716 B2 | 6/2009 | Lin |
| 7,559,433 B2 | 7/2009 | Yang et al. |
| D599,074 S | 8/2009 | Bizzell et al. |
| D603,119 S | 10/2009 | Yang et al. |
| 7,607,552 B2 | 10/2009 | Efstathiou |
| D604,472 S | 11/2009 | Blanks et al. |
| 7,614,519 B2 * | 11/2009 | Krauth et al. ............... 220/264 |
| 7,621,420 B2 | 11/2009 | Bandoh et al. |
| 7,656,109 B2 | 2/2010 | Yang et al. |
| D611,216 S | 3/2010 | Yang et al. |

(56) References Cited

U.S. PATENT DOCUMENTS

| | | |
|---|---|---|
| D611,217 S | 3/2010 | Bizzell et al. |
| D611,671 S | 3/2010 | Yang et al. |
| 7,694,838 B2 | 4/2010 | Yang et al. |
| 7,703,622 B1 | 4/2010 | Bynoe |
| D615,270 S | 5/2010 | Yang et al. |
| D615,722 S | 5/2010 | Yang et al. |
| 7,712,285 B2 | 5/2010 | Stravitz et al. |
| 7,741,801 B2 | 6/2010 | Fukuizumi |
| 7,748,556 B2 | 7/2010 | Yang et al. |
| 7,781,995 B2 | 8/2010 | Yang et al. |
| D623,817 S | 9/2010 | Yang et al. |
| D625,068 S | 10/2010 | Shannon |
| 7,806,285 B2 | 10/2010 | Yang et al. |
| D627,533 S | 11/2010 | Yang et al. |
| D627,944 S | 11/2010 | Wang et al. |
| D629,172 S | 12/2010 | Liao |
| D630,404 S | 1/2011 | Yang et al. |
| D631,221 S | 1/2011 | Yang et al. |
| D632,864 S | 2/2011 | Yang et al. |
| D634,911 S | 3/2011 | Yang et al. |
| D635,319 S | 3/2011 | Meyerhoffer |
| 7,896,187 B2 | 3/2011 | Haibel |
| 7,922,024 B2 | 4/2011 | Yang et al. |
| 7,950,543 B2 | 5/2011 | Yang et al. |
| D644,390 S | 8/2011 | Smeets et al. |
| 7,992,742 B1 | 8/2011 | Kim |
| 8,006,857 B2 | 8/2011 | Lin |
| D644,806 S | 9/2011 | Yang et al. |
| D644,807 S | 9/2011 | Yang et al. |
| D649,728 S | 11/2011 | Campbell |
| 8,074,833 B2 | 12/2011 | Yang et al. |
| 8,096,445 B2 | 1/2012 | Yang et al. |
| 8,136,688 B2 | 3/2012 | Lee et al. |
| D657,108 S | 4/2012 | Yang et al. |
| D657,109 S | 4/2012 | Liao |
| 8,297,470 B2 | 10/2012 | Yang et al. |
| 8,317,055 B2 | 11/2012 | Zawrotny et al. |
| D672,520 S | 12/2012 | Yang et al. |
| D673,750 S | 1/2013 | Quan |
| D675,802 S | 2/2013 | Yang et al. |
| D675,803 S | 2/2013 | Yang et al. |
| D689,255 S | 9/2013 | Sun Ting Kung et al. |
| 8,567,630 B2 | 10/2013 | Yang et al. |
| 8,569,980 B2 | 10/2013 | Yang et al. |
| 8,575,537 B2 | 11/2013 | Yao et al. |
| 8,672,171 B2 | 3/2014 | Wynn et al. |
| 8,678,219 B1 | 3/2014 | Wang et al. |
| 8,686,676 B2 | 4/2014 | Yang et al. |
| 8,716,969 B2 | 5/2014 | Yang et al. |
| 8,720,728 B2 | 5/2014 | Yang et al. |
| 8,766,582 B2 | 7/2014 | Yang et al. |
| 8,807,378 B2 | 8/2014 | Kaberna |
| 8,807,379 B1 | 8/2014 | Hammond |
| D714,510 S | 9/2014 | Yang et al. |
| D716,015 S | 10/2014 | van de Leest |
| 8,851,316 B2 | 10/2014 | Barrett et al. |
| 8,872,459 B2 | 10/2014 | Yang et al. |
| D725,861 S | 3/2015 | Yang et al. |
| D730,008 S | 5/2015 | Yang et al. |
| 9,051,093 B2 | 6/2015 | Yang et al. |
| D759,934 S | 6/2016 | Yang et al. |
| 2001/0002690 A1 | 6/2001 | Rosky |
| 2001/0020619 A1 | 9/2001 | Pfeifer et al. |
| 2002/0079315 A1 | 6/2002 | Yang |
| 2002/0092853 A1 | 7/2002 | Wang |
| 2002/0096523 A1 | 7/2002 | Pyles |
| 2002/0096524 A1 | 7/2002 | Hardesty |
| 2002/0104266 A1 | 8/2002 | Ranaudo |
| 2002/0116924 A1 | 8/2002 | Winkelmann et al. |
| 2003/0089719 A1 | 5/2003 | Berger |
| 2003/0102316 A1 | 6/2003 | Forest |
| 2003/0201265 A1 | 10/2003 | Lin |
| 2003/0201267 A1 | 10/2003 | Yang et al. |
| 2003/0205979 A1 | 11/2003 | Papari et al. |
| 2003/0230576 A1 | 12/2003 | Lin |
| 2004/0004080 A1 | 1/2004 | Yang et al. |
| 2004/0016756 A1 | 1/2004 | Lin |
| 2004/0020927 A1 | 2/2004 | Yang et al. |
| 2004/0134924 A1 | 7/2004 | Hansen et al. |
| 2004/0140782 A1 | 7/2004 | Okabe et al. |
| 2004/0164077 A1 | 8/2004 | Kuo |
| 2004/0174268 A1 | 9/2004 | Scott et al. |
| 2004/0175303 A1 | 9/2004 | Lin |
| 2004/0199401 A1 | 10/2004 | Wagner |
| 2004/0200938 A1 | 10/2004 | Forlivio |
| 2004/0206758 A1 | 10/2004 | Lin |
| 2004/0206760 A1 | 10/2004 | Gagnebin |
| 2004/0251746 A1 | 12/2004 | Ichimaru et al. |
| 2005/0017006 A1 | 1/2005 | Kuo |
| 2005/0017010 A1 | 1/2005 | Siegel et al. |
| 2005/0029281 A1 | 2/2005 | Westermann et al. |
| 2005/0103788 A1 | 5/2005 | Yang et al. |
| 2005/0133506 A1 | 6/2005 | Yang et al. |
| 2005/0230396 A1 | 10/2005 | Yang et al. |
| 2005/0230397 A1 | 10/2005 | Yang et al. |
| 2005/0258177 A1 | 11/2005 | Woodson |
| 2005/0258794 A1 | 11/2005 | Fukuizumi |
| 2005/0284870 A1 | 12/2005 | Yang et al. |
| 2006/0027579 A1 | 2/2006 | Yang et al. |
| 2006/0056741 A1 | 3/2006 | Yang et al. |
| 2006/0103086 A1 | 5/2006 | Niemeyer et al. |
| 2006/0138149 A1 | 6/2006 | Tracy |
| 2006/0163257 A1 | 7/2006 | Golbert |
| 2006/0175336 A1 | 8/2006 | Wang |
| 2006/0186121 A1 | 8/2006 | Yang et al. |
| 2006/0196874 A1 | 9/2006 | Yang |
| 2006/0213910 A1 | 9/2006 | Yang et al. |
| 2006/0226149 A1 | 10/2006 | Yang et al. |
| 2006/0237641 A1 | 10/2006 | Moeller et al. |
| 2006/0249510 A1 | 11/2006 | Lin |
| 2006/0255033 A1 | 11/2006 | Yang et al. |
| 2006/0261071 A1 | 11/2006 | Yang et al. |
| 2006/0278643 A1 | 12/2006 | Chiou |
| 2007/0012699 A1 | 1/2007 | Yang et al. |
| 2007/0029323 A1 | 2/2007 | Yang et al. |
| 2007/0034334 A1 | 2/2007 | Ramsey et al. |
| 2007/0045326 A1 | 3/2007 | Tramontina et al. |
| 2007/0090112 A1 | 4/2007 | Kalman et al. |
| 2007/0114847 A1 | 5/2007 | Ichimaru et al. |
| 2007/0181579 A1 | 8/2007 | Kuo et al. |
| 2007/0182551 A1 | 8/2007 | Yang et al. |
| 2007/0205195 A1 | 9/2007 | Yang et al. |
| 2007/0209846 A1 | 9/2007 | Wilson |
| 2007/0215622 A1 | 9/2007 | Perez |
| 2007/0241109 A1 | 10/2007 | Lin |
| 2007/0266637 A1 | 11/2007 | McGowan |
| 2007/0272691 A1 | 11/2007 | Wang et al. |
| 2007/0289972 A1 | 12/2007 | Wynn et al. |
| 2008/0011754 A1 | 1/2008 | Ramsey |
| 2008/0011910 A1 | 1/2008 | Ramsey |
| 2008/0041863 A1 | 2/2008 | Forest |
| 2008/0083756 A1 | 4/2008 | Daniels |
| 2008/0083757 A1 | 4/2008 | Parker et al. |
| 2008/0099274 A1 | 5/2008 | Seel |
| 2008/0128428 A1 | 6/2008 | Beckerman |
| 2008/0164257 A1 | 7/2008 | Boll et al. |
| 2008/0236275 A1 | 10/2008 | Breed et al. |
| 2008/0237234 A1 | 10/2008 | Yang et al. |
| 2008/0257889 A1 | 10/2008 | Kovacevich et al. |
| 2008/0257890 A1 | 10/2008 | Kovacevich et al. |
| 2008/0257891 A1 | 10/2008 | Kovacevich et al. |
| 2008/0264948 A1 | 10/2008 | Kovacevich et al. |
| 2008/0264950 A1 | 10/2008 | Kovacevich et al. |
| 2008/0272119 A1 | 11/2008 | Efstathiou |
| 2008/0272127 A1 | 11/2008 | Kovacevich et al. |
| 2009/0084788 A1 | 4/2009 | Yang et al. |
| 2009/0136341 A1 | 5/2009 | Kenyon |
| 2009/0194532 A1 | 8/2009 | Yang et al. |
| 2009/0230131 A1 | 9/2009 | McDuffie et al. |
| 2009/0261105 A1 | 10/2009 | Cunningham et al. |
| 2009/0266836 A1 | 10/2009 | Mobley |
| 2010/0006572 A1 | 1/2010 | Chiou |
| 2010/0084235 A1 | 4/2010 | Lu |
| 2010/0096894 A1 | 4/2010 | Fukai |

(56) References Cited

U.S. PATENT DOCUMENTS

| | | | |
|---|---|---|---|
| 2010/0122985 | A1* | 5/2010 | Peters et al. .................. 220/262 |
| 2010/0147865 | A1 | 6/2010 | Yang et al. |
| 2010/0170904 | A1 | 7/2010 | Kalman et al. |
| 2010/0224627 | A1 | 9/2010 | Yang et al. |
| 2010/0237074 | A1 | 9/2010 | Yang et al. |
| 2010/0252557 | A1 | 10/2010 | Clements |
| 2010/0294769 | A1 | 11/2010 | Lee et al. |
| 2011/0017735 | A1 | 1/2011 | Wang et al. |
| 2011/0049149 | A1 | 3/2011 | Shih |
| 2011/0139781 | A1 | 6/2011 | Jin et al. |
| 2011/0220646 | A1 | 9/2011 | Yang et al. |
| 2011/0220647 | A1 | 9/2011 | Yang et al. |
| 2011/0220648 | A1 | 9/2011 | Yang et al. |
| 2011/0220655 | A1 | 9/2011 | Yang et al. |
| 2011/0272409 | A1 | 11/2011 | Kasbohm |
| 2012/0234849 | A1 | 9/2012 | Hughes et al. |
| 2012/0261423 | A1 | 10/2012 | Zawrotny et al. |
| 2013/0098913 | A1 | 4/2013 | Yang et al. |
| 2013/0105487 | A1 | 5/2013 | Baik |
| 2013/0233853 | A1 | 9/2013 | Yang et al. |
| 2013/0233857 | A1 | 9/2013 | Yang et al. |
| 2013/0240592 | A1 | 9/2013 | Woodruff |
| 2013/0248535 | A1 | 9/2013 | Wolfe et al. |
| 2013/0300119 | A1 | 11/2013 | Anzalone et al. |
| 2014/0183193 | A1 | 7/2014 | Hammond et al. |
| 2014/0246432 | A1 | 9/2014 | Yang et al. |
| 2014/0246434 | A1 | 9/2014 | Yang et al. |
| 2014/0345453 | A1 | 11/2014 | Oh et al. |
| 2015/0251849 | A1 | 9/2015 | Yang et al. |
| 2015/0259139 | A1 | 9/2015 | Yang et al. |
| 2015/0259140 | A1 | 9/2015 | Yang et al. |
| 2015/0321841 | A1 | 11/2015 | Salas et al. |

FOREIGN PATENT DOCUMENTS

| | | |
|---|---|---|
| CA | 2519295 | 3/2007 |
| CA | 132181 | 6/2010 |
| CA | 136938 | 5/2011 |
| CA | 141819 | 4/2012 |
| CA | 146601 | 2/2013 |
| CA | 152797 | 4/2014 |
| CA | 158595 | 4/2015 |
| CA | 158685 | 4/2015 |
| CN | 201130284559.9 | 8/2011 |
| CN | 102190144 A | 9/2011 |
| CN | 301947175 S | 6/2012 |
| CN | 201330418089 | 8/2013 |
| CN | 103300590 A | 9/2013 |
| CN | 302771721 S | 3/2014 |
| CN | 104016030 A | 9/2014 |
| CN | 303188855 S | 4/2015 |
| CN | 303206241 S | 5/2015 |
| CN | 303611394 S | 3/2016 |
| CN | 303622098 S | 3/2016 |
| DE | 1610087 | 6/1950 |
| DE | 822376 | 11/1951 |
| DE | 1283741 | 7/1966 |
| DE | 8436939 | 3/1985 |
| DE | 9108341 | 10/1991 |
| DE | 4225936 A1 | 2/1994 |
| DE | 19525885 | 3/1997 |
| DE | 19617823 | 11/1997 |
| DE | 19809331 | 5/1999 |
| DE | 29918687 | 3/2000 |
| DE | 19933180 | 1/2001 |
| DE | 10148997 | 4/2003 |
| DE | 20217561 | 3/2004 |
| EP | 0582240 | 7/1993 |
| EP | 0903305 A1 | 3/1999 |
| EP | 0906876 | 4/1999 |
| EP | 1094017 B1 | 3/2003 |
| EP | 1361176 | 11/2003 |
| EP | 1136393 | 4/2004 |
| EP | 1447342 A2 | 8/2004 |
| EP | 1600373 A2 | 11/2005 |
| EP | 1647503 A1 | 4/2006 |
| EP | 1686073 | 8/2006 |
| EP | 1918223 A1 | 5/2008 |
| EP | 1700799 B1 | 8/2008 |
| EP | 001164826-000 | 9/2009 |
| EP | 001232904-0001 | 10/2010 |
| EP | 2343250 A1 | 7/2011 |
| EP | 001908575-0001 | 8/2011 |
| EP | 001317416-0001 | 4/2012 |
| EP | 001317416-0002 | 4/2012 |
| EP | 001335285-0001 | 7/2012 |
| EP | 001335293-0001 | 7/2012 |
| EP | 001381636-001 | 8/2013 |
| EP | 001381792-0001 | 8/2013 |
| EP | 2636611 A1 | 9/2013 |
| EP | 2636613 A1 | 9/2013 |
| EP | 001420590-0001 | 9/2014 |
| EP | 2772454 A2 | 9/2014 |
| EP | 2915763 A1 | 9/2015 |
| EP | 2918518 A2 | 9/2015 |
| EP | 002766782-0001 | 11/2015 |
| EP | 002766782-0002 | 11/2015 |
| EP | 002766881-0001 | 11/2015 |
| FR | 2887152 | 12/2006 |
| GB | 191004921 | 6/1910 |
| GB | 2384418 | 7/2003 |
| JP | 02 152670 | 6/1990 |
| JP | H06-56011 | 8/1994 |
| JP | 06-272888 | 9/1994 |
| JP | D1300450 | 5/2007 |
| JP | D1300451 | 5/2007 |
| JP | D1322056 | 2/2008 |
| JP | D1398668 | 10/2010 |
| KR | 3003841370000 | 6/2005 |
| KR | 3004095430000 | 3/2006 |
| KR | 3004095430001 | 7/2006 |
| NL | 6908550 | 12/1970 |
| TW | D112733 | 9/2006 |
| TW | D129485 | 7/2009 |
| TW | D133382 | 2/2010 |
| TW | D133678 | 3/2010 |
| TW | D147147 | 5/2012 |
| TW | D154797 | 7/2013 |
| TW | D158187 | 1/2014 |
| TW | D161587 | 7/2014 |
| TW | D168957 | 7/2015 |
| TW | D170334 | 9/2015 |
| TW | 201538406 | 10/2015 |
| WO | WO 92/02430 | 2/1992 |
| WO | WO 96/33671 | 10/1996 |
| WO | WO 2005/080232 A1 | 9/2005 |
| WO | WO 2006-079263 | 8/2006 |
| WO | WO 2007/139570 | 12/2007 |
| WO | WO 2009/114495 | 9/2009 |
| WO | WO 2015/134902 A1 | 9/2015 |
| WO | WO 2015/138625 A1 | 9/2015 |
| WO | WO 2016/054109 A1 | 4/2016 |

OTHER PUBLICATIONS

U.S. Appl. No. 13/783,149, filed Mar. 1, 2013, Yang et al.
U.S. Appl. No. 29/447,313, filed Mar. 1, 2013, Yang et al.
European Search Report for European Application No. 06010394, dated Aug. 24, 2006, in 1 page.
Trento Corner 23 Trash Can, Hailo product brochure, http://www.hailo.de/html/default.asp?site=12__71__107&lang=en.
U.S. Appl. No. 29/484,903, filed Mar. 13, 2014, Yang et al.
U.S. Appl. No. 29/484,764, filed Mar. 1, 2013, Yang et al.
Extended European Search Report for European Application No. 13158479.9, dated Jun. 20, 2013, in 8 pages.
U.S. Appl. No. 14/637,270, filed Mar. 4, 2015, Yang et al.
U.S. Appl. No. 14/639,049, filed Mar. 4, 2015, Yang et al.
U.S. Appl. No. 14/639,862, filed Mar. 5, 2015.
U.S. Appl. No. 29/519,549, filed Mar. 5, 2015.
U.S. Appl. No. 29/519,551, filed Mar. 5, 2015.

(56) References Cited

OTHER PUBLICATIONS

U.S. Appl. No. 14/707,978, filed May 8, 2015.
U.S. Appl. No. 14/856,309, filed Sep. 26, 2015, Yang et al.
U.S. Appl. No. 29/548,018, filed Dec. 9, 2015, Yang et al.
U.S. Appl. No. 29/557,032, filed Mar. 4, 2016, Yang et al.
U.S. Appl. No. 29/557,088, filed Mar. 4, 2016, Yang et al.
U.S. Appl. No. 29/563,650, filed May 6, 2016, Yang et al.

* cited by examiner

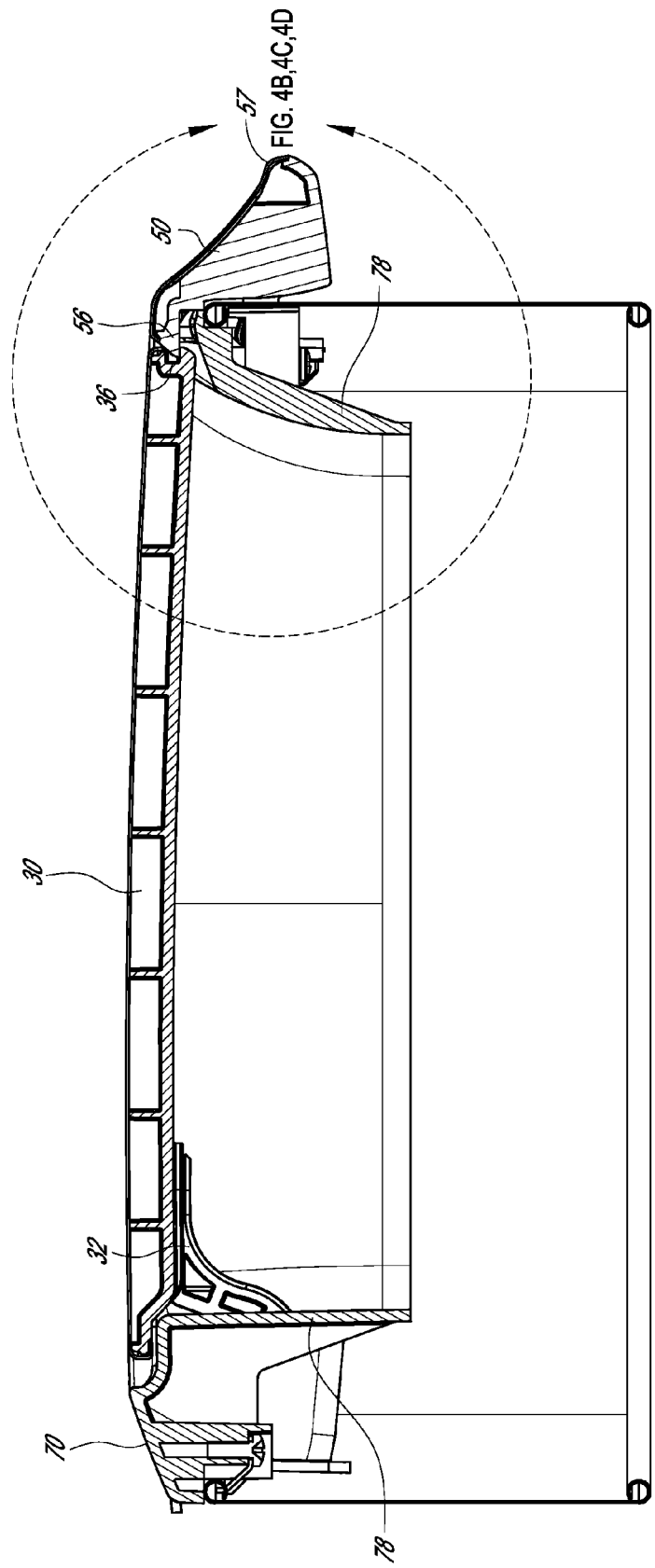

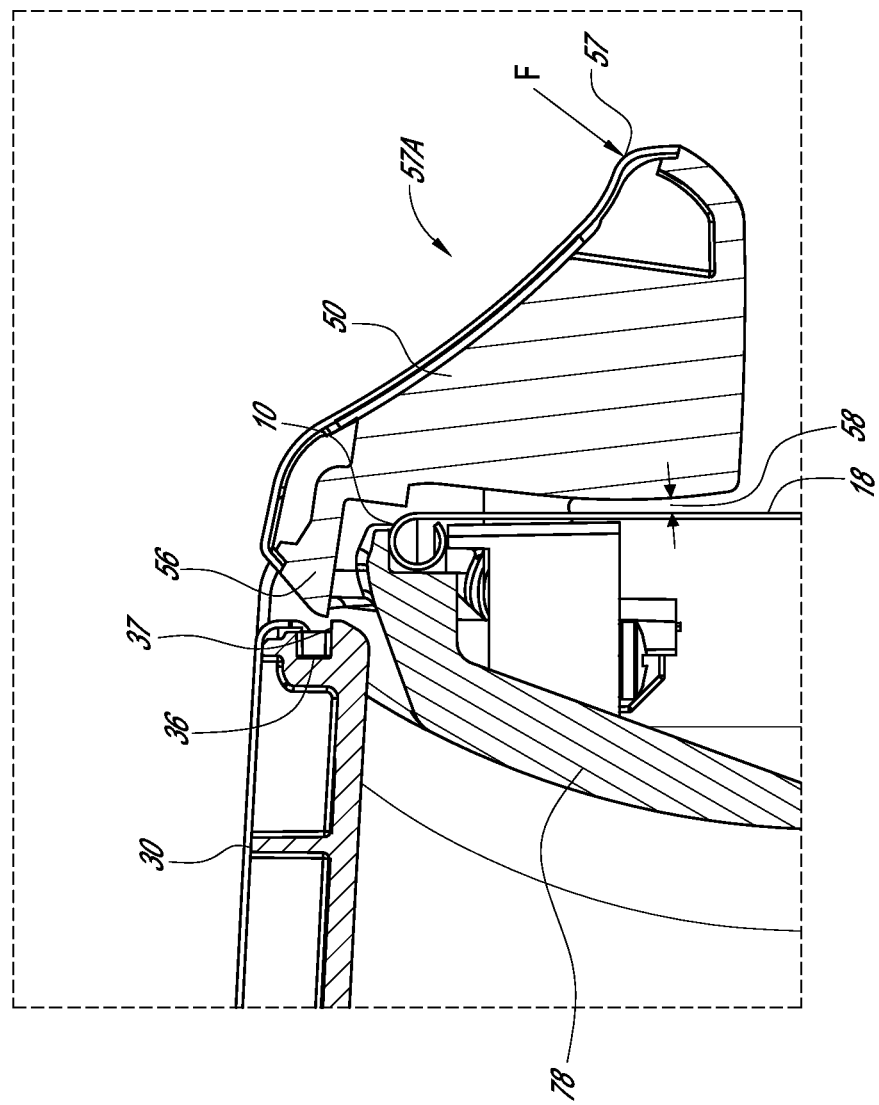

TRASH CANS WITH FEATURES TO AID IN ACTUATION

CROSS-REFERENCE TO RELATED APPLICATIONS

This present application claims priority benefit under 35 U.S.C. §119(e) to U.S. Provisional Application No. 61/609,179, filed Mar. 9, 2012, entitled "TRASH CANS WITH FEATURES TO AID IN ACTUATION," which is hereby incorporated by reference in its entirety.

BACKGROUND

1. Technical Field

Embodiments of the disclosed devices generally relate to the field of trash cans and other receptacles.

2. Description of the Related Art

Receptacles and other devices having lids or doors are used in a variety of different settings. For example, in both residential and commercial settings, trash cans and other devices often have lids or doors for protecting or preventing the escape of the contents of the receptacle. In the context of trash cans, some trash cans include lids or doors to prevent odors from escaping and to hide the trash within the receptacle from view. Additionally, the lid of a trash can help prevent contaminants from escaping from the receptacle.

In some instances, trash can lids or doors are equipped with a latching or locking mechanism which secures the lid in a shut position. These types of trash cans sometimes include a foot pedal which is connected to the lid for moving the lid toward the open position. Handles or other actuators for opening trash cans are sometimes located on the lid of the trash can.

SUMMARY OF THE DISCLOSURE

Several embodiments of refuse storage receptacles (e.g., trash cans) are disclosed. In some embodiments, a refuse storage receptacle includes a body portion comprising an interior cavity and at least one opening located on a top portion of the body. A refuse storage can also have a lid portion configured to engage with the top portion of the body. In some embodiments, the lid portion comprises a cap (e.g., a peripheral portion and/or a frame member). The frame member can have an upper portion and a lower portion. The lower portion can be configured to engage with a bin. In some embodiments, the frame member can have a frame aperture that is configured to allow refuse to pass through the frame member and into the interior cavity of the bin.

In some variants, the peripheral portion has an outer edge, an inner edge, and one or more lid engagement members. In some embodiments, the inner edge of the peripheral portion has an opening configured to allow refuse to pass through the peripheral portion and into the interior cavity of the bin. In some embodiments, the peripheral portion is configured to connect with the upper portion of the frame member.

In some embodiments, the receptacle can have a lid rotationally connected to the peripheral portion in the region of the opening. The lid can have a shape that generally corresponds to the shape of the opening in the peripheral portion and can have at least one attachment member (e.g., a hinge member) on a first side of the lid and a securement member on a second side of the lid generally opposite the first side. In some embodiments, the at least one hinge attachment member is configured to connect to the one or more lid engagement members of the peripheral portion. The lid can be configured to transition between an opened configuration and a closed configuration, wherein the lid inhibits access to the opening in the peripheral portion when the lid is in a closed configuration.

In some embodiments, the receptacle has an actuator rotationally connected to the peripheral portion, the actuator extending outwardly and downwardly from the outer edge of the peripheral portion, the actuator configured to rotate between an open position and a closed position, and the actuator rotationally biased toward the closed position. In some embodiments, the receptacle has a locking member configured to engage with the securement member of the lid when the actuator is in the closed position such that the locking member secures the lid in the closed configuration and inhibits the lid from moving to the open configuration, the engagement of the locking member and the securement member being released upon application of an input force at an effective angle upon the actuator, thereby allowing the lid to move to the open configuration.

In some embodiments, the locking member comprises a flange with a sloped upper edge configured to deflect the actuator. In some embodiments, the securement member comprises a recess, the recess configured to receive the flange when the lid is in a closed configuration and the locking member is in a closed position. In some embodiments, the securement member comprises a flange with a sloped lower edge configured to engage and deflect the actuator. In some variants, the locking member comprises a recess configured to receive the flange when the lid is in a closed configuration and the locking member is in a closed position.

According to some configurations, the effective angle of the input force, as measured downward from level with the ground, is between 0° and 90°. In some embodiments, the peripheral portion further comprises at least biasing member, such as a torsion spring, that is configured to engage with at least one of the at least one lid engagement members and to rotationally bias the lid toward the open configuration. In some embodiments, the peripheral portion further comprises at least one biasing member, such as a torsion spring, that is configured to engage with the actuator and to rotationally bias the actuator toward the closed position. In some embodiments, the peripheral portion has a generally rectangular shape. According to some variants, the lid is rotationally connected to one side of the opening of the peripheral portion. The lid can be rotationally biased to the open configuration.

In some embodiments, the actuator comprises an outer edge on the side of the actuator generally opposite the peripheral portion, an inner edge on the side of the actuator adjacent the peripheral portion, and a hinge member about which the actuator can rotate. In some embodiments, the outer edge of the actuator and the outer edge of the peripheral portion form a substantially continuous curve. In some embodiments, the outer edge of the actuator is longer than the inner edge of the actuator. In some further embodiments, the inner edge of the actuator is longer than the outer edge of the actuator. And in some further embodiments, the inner edge of the actuator is substantially the same length as the outer edge of the actuator.

In some embodiments, the lid portion further comprises one or more damping members configured to slow down and diminish the momentum of the lid, thereby smoothing the transition between the open configuration and the closed configuration and diminishing noise and reverberation during closure. In some embodiments, one or more of the securement member and the locking member comprises a magnet. In some embodiments, when the receptacle is positioned on generally flat ground in the normal configuration for use, the distance between the generally lowest point on the actuator and the ground is greater than the distance between the ground and the lower portion of the frame member.

In some embodiments, the peripheral portion further comprises an inner shroud extending downward from the lid, the inner shroud being configured to guide trash or other articles from the peripheral aperture into the interior cavity of the body. In some embodiments, the frame member further comprises an outer shroud extending downward from the upper portion of the frame member, the outer shroud being configured to inhibit access from the sides of the lid portion to the interior cavity of the body. In some embodiments, the frame member has a frame aperture that is configured to allow refuse to pass through the frame member and into the interior cavity of the bin.

In some embodiments, the lid portion comprises a peripheral portion having an outer edge and an inner edge, the inner edge of the peripheral portion having an opening configured to allow refuse to pass through the peripheral portion and into the interior cavity of the bin, the peripheral portion configured to connect with the upper portion of the frame member. In some embodiments, the lid portion comprises a lid rotationally connected to the opening of the peripheral portion, the lid comprising a securement member and configured to transition between an opened configuration and a closed configuration, wherein the lid inhibits access to the opening in the peripheral portion when the lid is in a closed configuration. The lid portion can comprise an actuator rotationally connected to the peripheral portion and configured to rotate between an open position and a closed position. In some embodiments, the actuator is rotationally biased toward the closed position. The actuator can comprise a locking member configured to releasably engage with the securement member of the lid when the actuator is in the closed position such that the locking member secures the lid in the closed configuration and inhibits the lid from moving to the open configuration. The engagement of the locking member and the securement member can be released upon application of an input force at an effective angle upon the actuator.

In some embodiments, the securement member is configured to contact the locking member before the securement member is engaged with the locking member as the lid rotates from the open configuration to the closed configuration, thereby rotating the actuator from the closed position toward the open position, whereupon the actuator is configured to rotate to the closed position upon engagement between the securement member and the locking member.

According to some variants, the locking member comprises a flange with a sloped upper edge configured to deflect the actuator. In some embodiments, the securement member comprises a recess, the recess configured to receive the flange when the lid is in a closed configuration and the locking member is in a closed position. In some embodiments, the securement member comprises a flange with a sloped lower edge configured to engage and deflect the actuator. In some embodiments, the locking member comprises a recess, the recess configured to receive the flange when the lid is in a closed configuration and the locking member is in a closed position.

A method of opening and closing the lid of a refuse receptacle having a frame member, peripheral portion, lid, and actuator, can include the step of deflecting the actuator from a closed position to an open position, thereby releasing a locking member on the actuator from engagement with a securement member on the lid. The method can include rotating the lid from a closed configuration to an open configuration. In some embodiments, the method includes releasing the actuator, thereby allowing the actuator to return to the closed position. According to some configurations, the method includes rotating the lid from the open configuration toward the closed configuration and bringing the securement member into contact with the locking member, thereby deflecting the actuator from a closed position toward an open position. In some embodiments, the method includes bringing the securement portion into engagement with locking member, thereby returning the actuator to the closed position.

For purposes of summarizing the disclosure, certain aspects, advantages and features of the inventions have been described herein. It is to be understood that not necessarily any or all such advantages are achieved in accordance with any particular embodiment of the inventions disclosed herein. No aspects of this disclosure are essential or indispensable.

BRIEF DESCRIPTION OF THE DRAWINGS

Certain embodiments of trash cans will be discussed in detail with reference to the following figures. These figures are provided for illustrative purposes only, and the disclosure is not limited to the subject matter illustrated in the figures.

FIG. 4A is a cross-section view of the cap portion of FIG. 2A along the section plane 4A-4A of FIG. 2A with the lid in a closed configuration.

FIG. 4C is a close-up view of the portion identified in FIG. 4A with the actuator rotated.

DETAILED DESCRIPTION OF CERTAIN EMBODIMENTS

Various trash cans are described herein in reference to various embodiments and drawings. It will be appreciated by those skilled in the art that variations and improvements may be accomplished in view of these teachings that are encompassed by the scope and spirit of the present disclosure. By way of illustration, the present subject matter is described in reference to a trash can, such as a trash can of the type typically used in kitchens, for example. Other types of containers, such as, for example, diaper pails or storage containers of any other type, are contemplated by the present disclosure and can be used with any or all of the features described herein.

Figure 1:
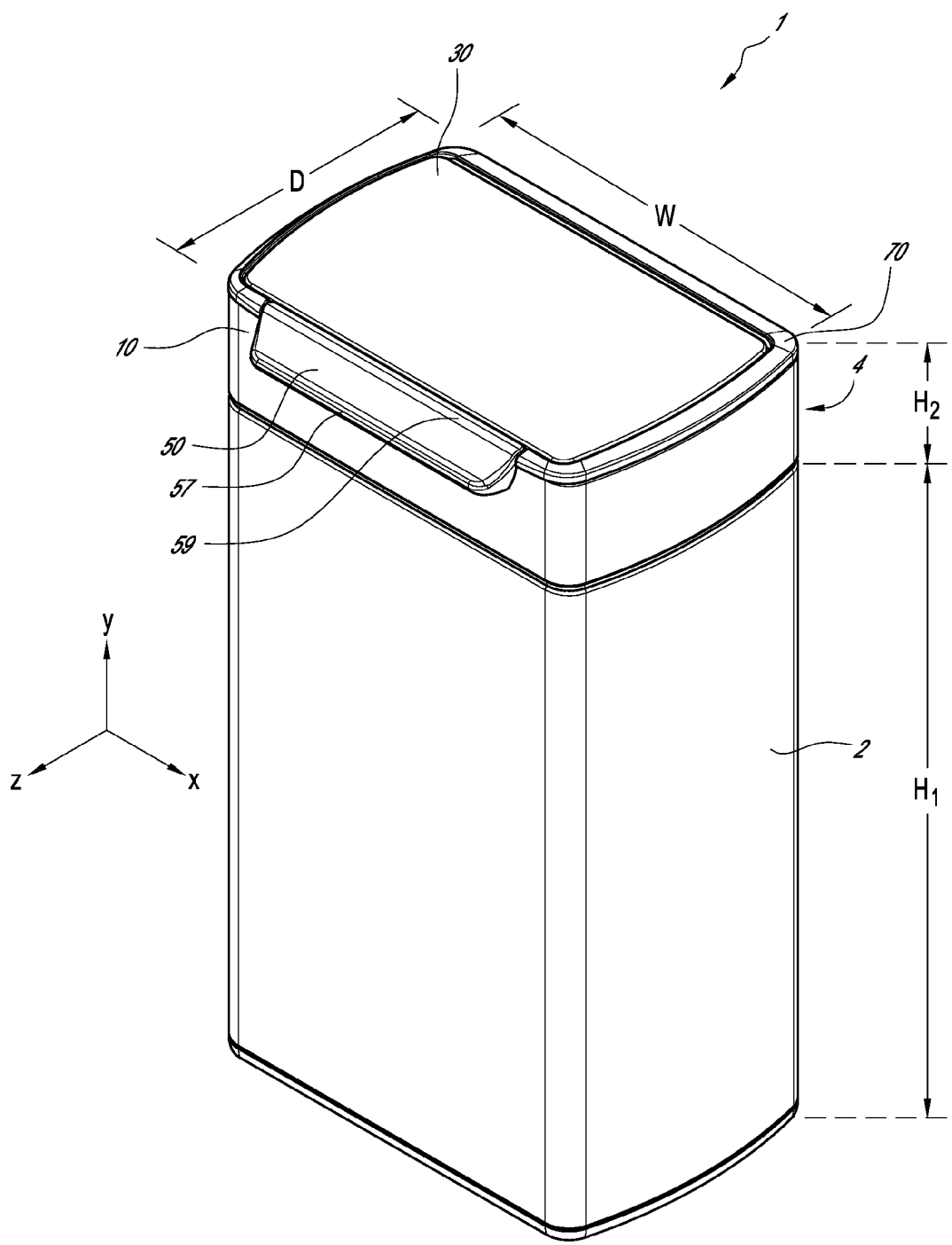
FIG. 1 is a perspective view of a trash can with a cap portion including a lid.
Figure 1A:
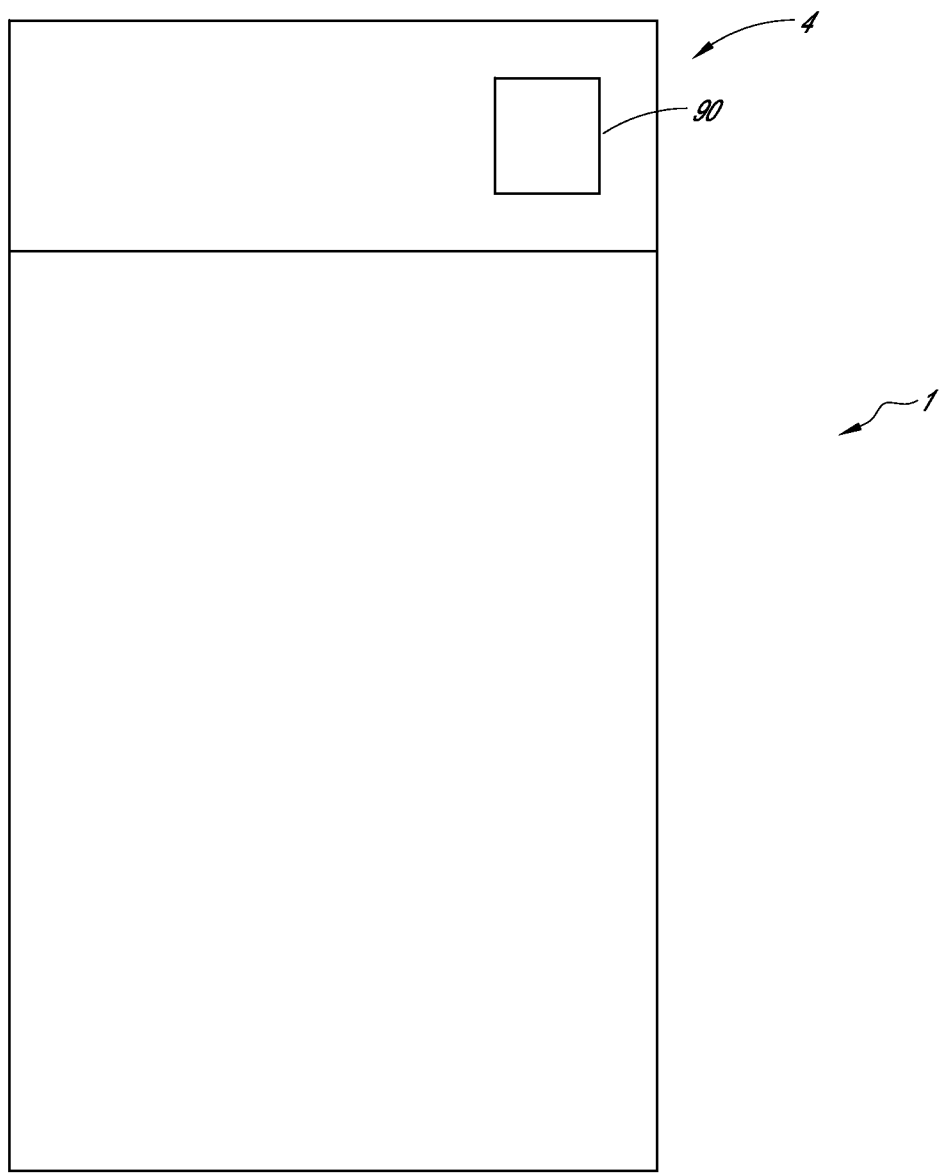
FIG. 1A is a schematic diagram of a trashcan with a damping member to facilitate a slow and/or steady opening and/or closing of the lid.
Figure 4B:
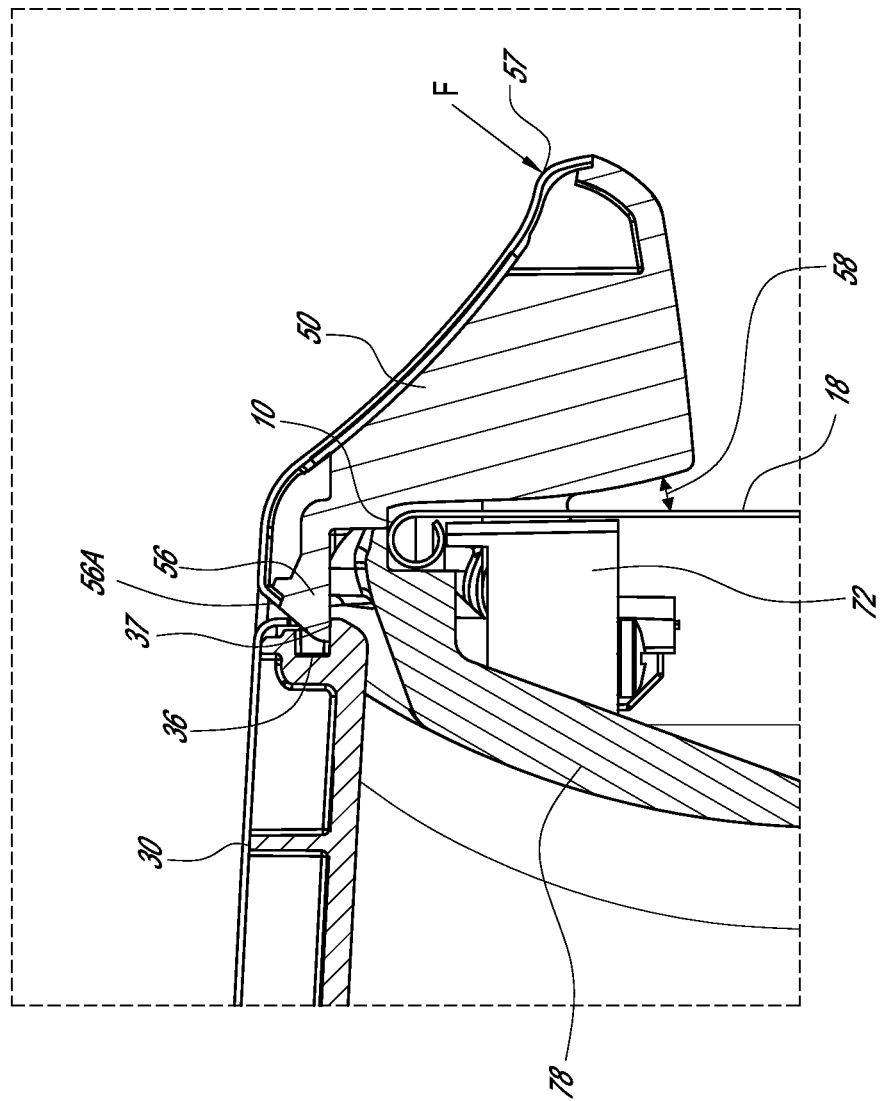
FIG. 4B is a close-up view of the portion identified in FIG. 4A.
Figure 4D:
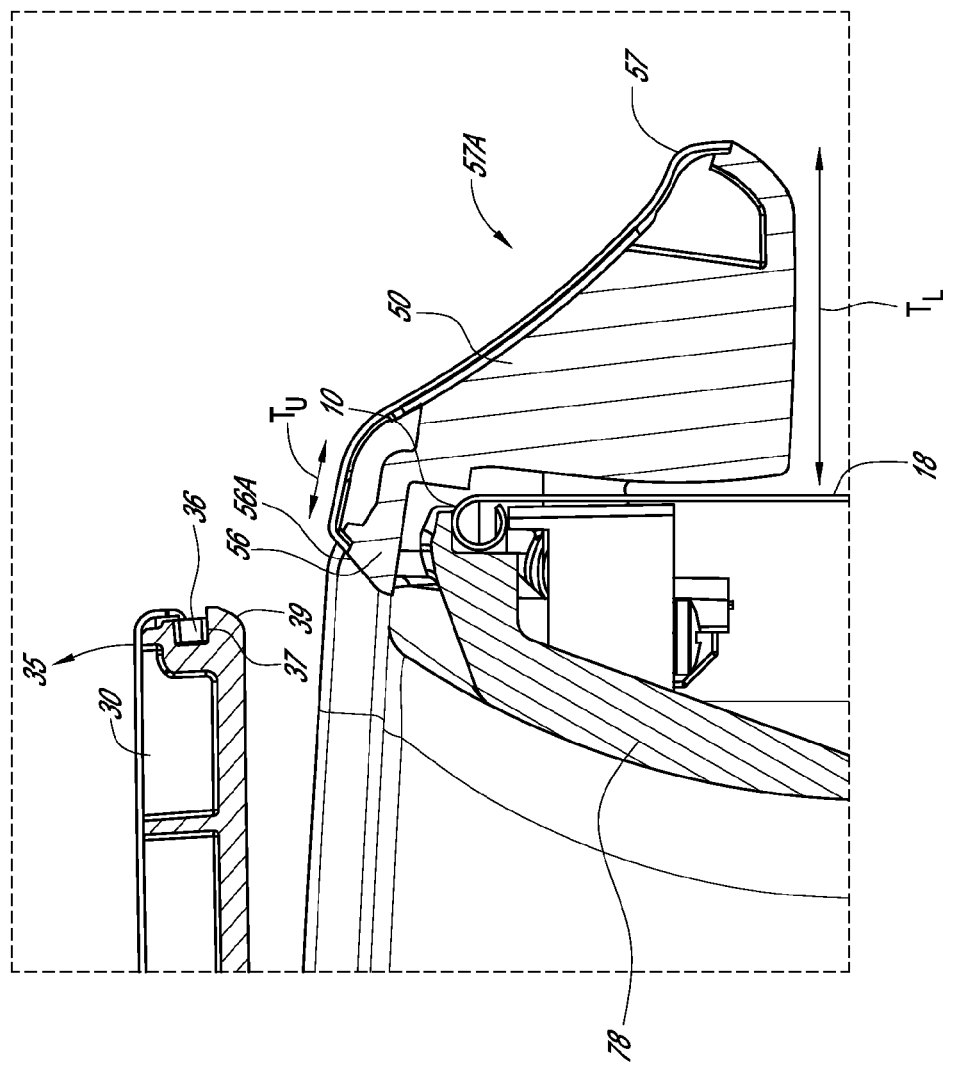
FIG. 4D is a close-up view of the portion identified in FIG. 4A with the lid partially open.
Figure 4E:
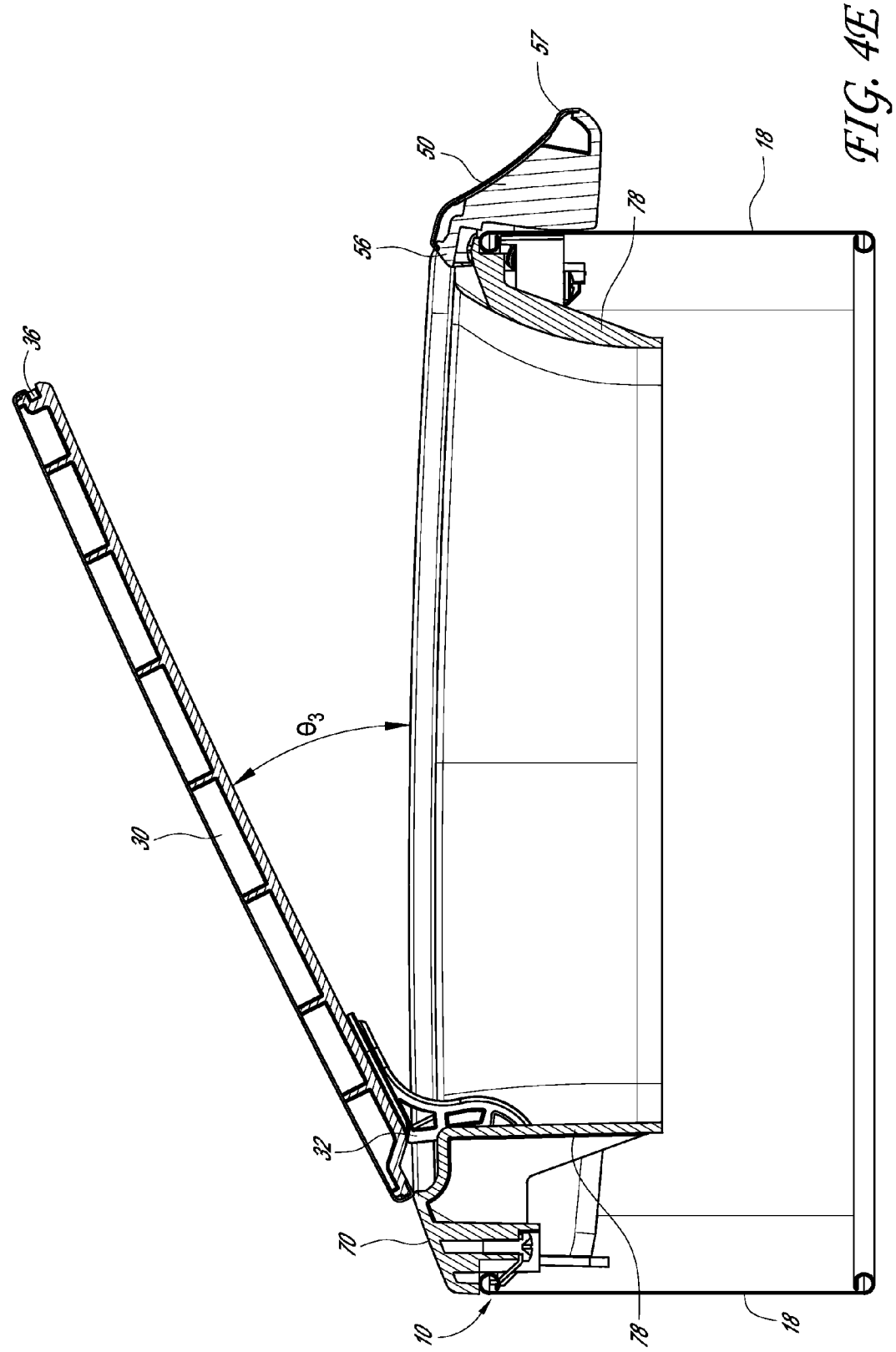
FIG. 4E is a cross-section view of the cap portion of FIG. 2A along the section plane 4A-4A of FIG. 2A with the lid in an open configuration.
Figure 5A:
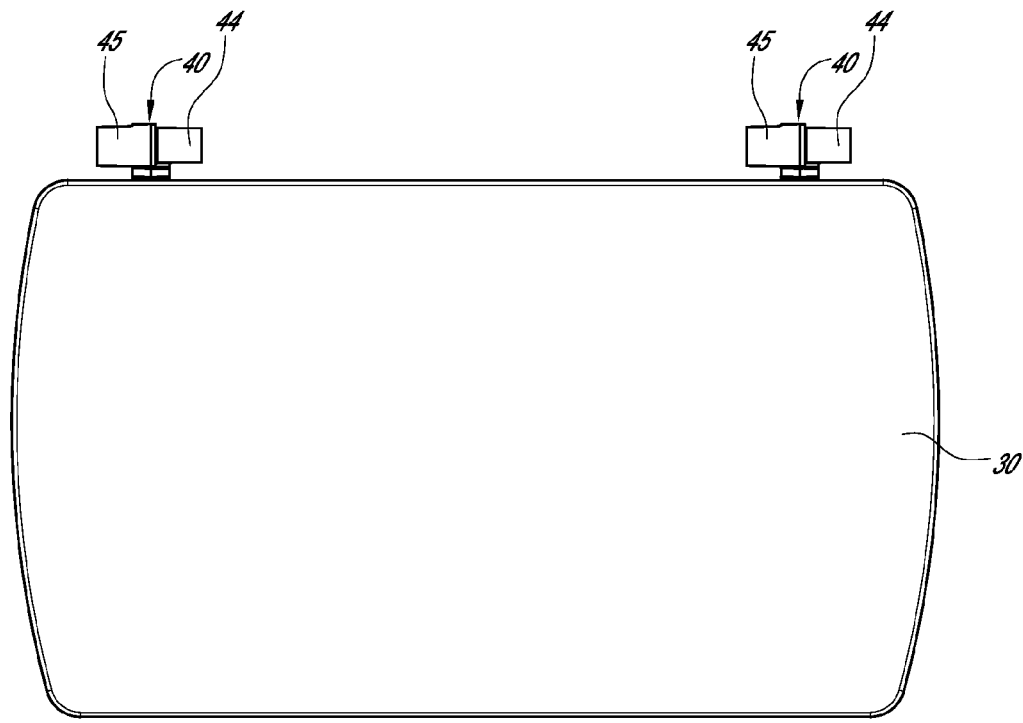
FIG. 5A is a top view of the lid of the trash can of FIG. 1.
Figure 5B:
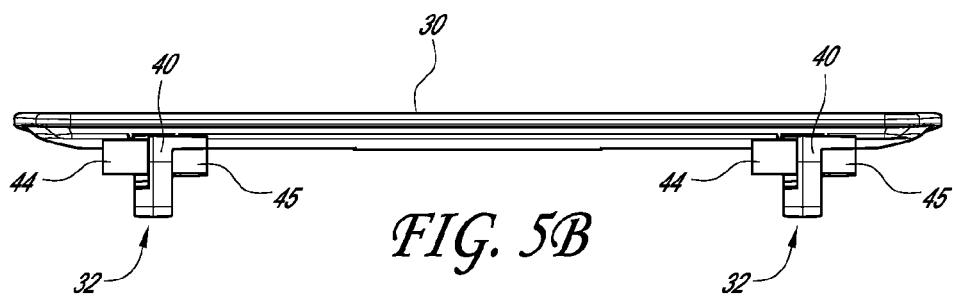
FIG. 5B is a rear view of the lid of the trash can of FIG. 1.
Figure 5C:
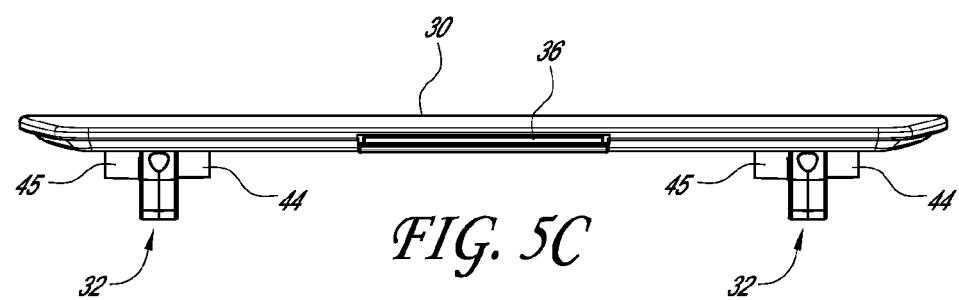
FIG. 5C is a front view of the lid of the trash can of FIG. 1.
Figure 5D:
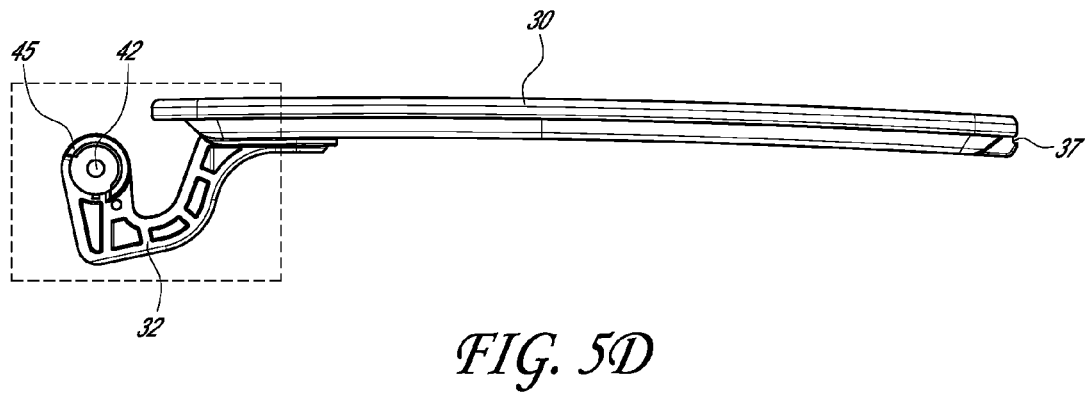
FIG. 5D is a left side view of the lid of the trash can of FIG. 1.
Figure 5E:
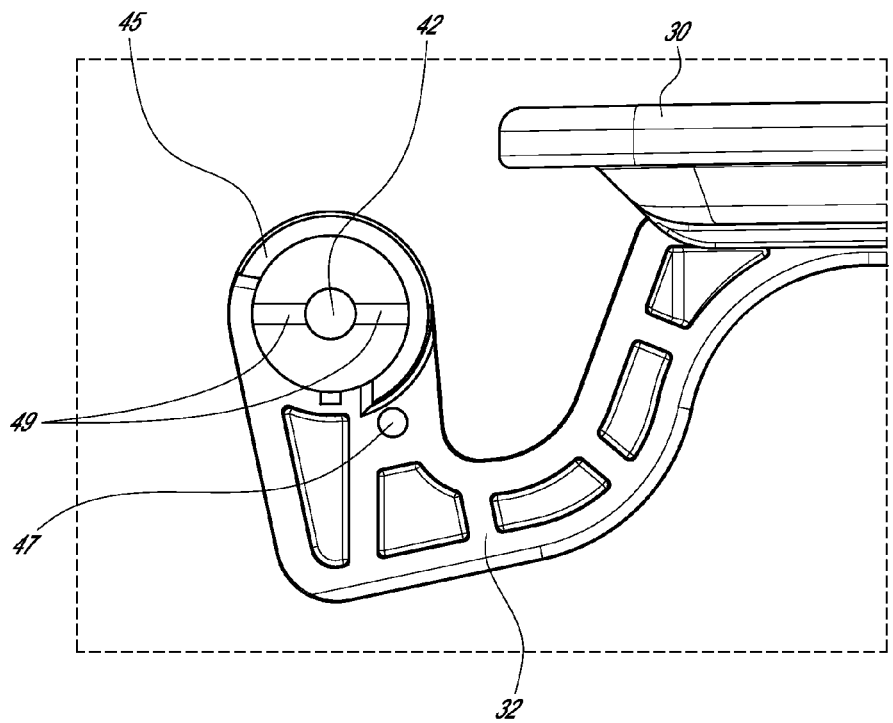
FIG. 5E is a close-up left side view of the rear end of the lid of FIG. 5D, as identified by the portion identified in FIG. 5D.
Figure 5F:
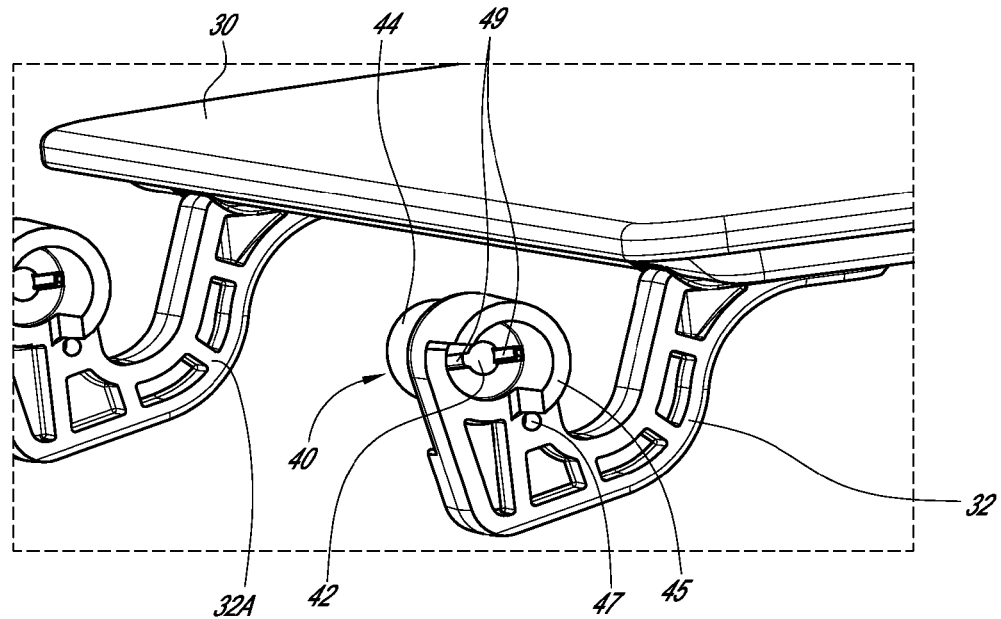
FIG. 5F is a close-up rear left side perspective view of the lid of FIG. 5A.
Figure 5G:
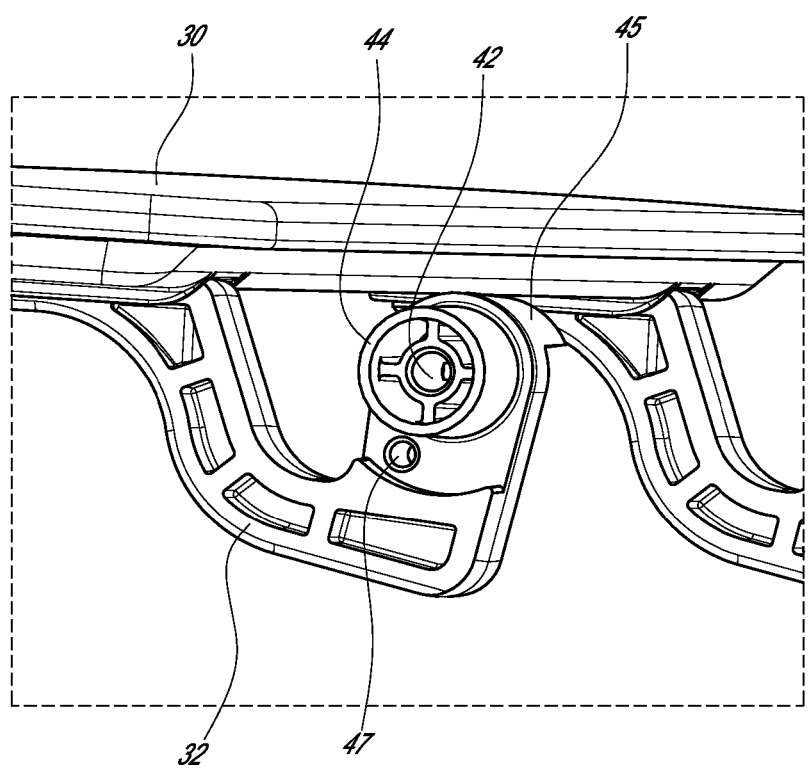
FIG. 5G is a close-up rear right side perspective view of the lid of FIG. 5A.

With reference to FIG. 1, a trash can 1 can generally have a body 2 having an inner cavity configured to receive trash. A cap portion 4 can be removably attached to the top of the body 2. In some embodiments, the cap portion 4 can include a frame member 10 and a peripheral portion (e.g., a trim) 70. The peripheral portion 70 can define an opening in the top of the cap portion 4 through which trash or other matter can be inserted into the body 2 of the trash can 1. In some embodiments, the trash can 1 can include a plastic bucket or liner (not shown) for containing trash or objects therein, where the plastic liner is positioned inside the body 2 of the trash can 1. When the cap 4 is removed from the body 2, the top portion of the plastic liner can be exposed above the top portion of the body 2, such that it is easy for the user to insert or remove trash bags from the liner. When the cap 4 is attached to the body 2, the liner can be completely hidden from view. In some embodiments, a trash bag can be inserted in the body 2 to collect trash and when the cap portion 4 is attached to the body 2, the cap portion 4 can pinch down on any overhanging portions of the trash bag to prevent it from falling into the body 2. In some embodiments, the cap portion 4 can include a lid 30. In some embodiments, the lid 30 can be pivotally attached to the peripheral portion 70. In some embodiments, the lid 30 can be pivotally attached to the frame member 10. The lid 30 can be configured to transition between a closed configuration (as illustrated in FIG. 1) and an open configuration (as illustrated in FIG. 4E). As shown in FIG. 1A, in some embodiments, the trash can 1 can include one or more damping members 90 configured to inhibit sudden or fast opening of the lid 30 that can result in rocking of the trash can 1.

In some embodiments, the cap portion 4 includes an actuator 50. In some embodiments, the actuator 50 can be configured to allow the lid 30 to transition from the closed configuration to the open configuration upon application of an input force F on the upper surface 57A of the actuator 50, on or near the outer edge 57 of the actuator 50. In some embodiments, the input force F can be applied at an angle that is acute with respect to the ground and that is generally perpendicular to the contact surface (e.g., the upper surface 57A) of the actuator 50. As discussed in more detail below, the actuator 50 can be configured to rotate out of engagement with the lid 30. In some variants, the actuator 50 can be rotationally attached to the peripheral portion 70. In some embodiments, the actuator 50 can be rotationally attached to the frame member 10. In some embodiments, the actuator 50 can be attached to the lid 30.

In some embodiments, the outer edge 57 and an inner edge 59 of the actuator are substantially the same length. In some embodiments, the inner edge 59 is longer than the outer edge 57. For example, in some embodiments, the ratio of the length of the inner edge 59 to the length of the outer edge 57 is greater than or equal to about: 1:1, 1.3:1, 1.5:1, values in between, or otherwise. In some embodiments, the outer edge 57 is longer than the inner edge 59. For example, in some embodiments, the ratio of the length of the outer edge 57 to the length of the inner edge 59 is greater than or equal to about: 1:1, 1.05:1, 1.1:1, 1.3:1, 1.5:1, values in between, or otherwise. In some embodiments, a wide outer edge 57 (e.g., an edge that is substantially wider than the upper edge of the peripheral portion) can facilitate easier opening of the lid 30 due to an increased area of contact on the actuator 50. In some embodiments, the upper surface 57A of the actuator 50 comprises a generally downwardly sloping or curved region. In some embodiments, the region is generally concave. In certain variants, the region is generally flat or convex.

As illustrated, the upper surface 57A can be generally or virtually entirely continuous from its upper edge to its lower edge, in either or both of the vertical and horizontal directions. The actuator can comprise a generally rounded or contoured lower edge to avoid or reduce discomfort upon contact with it. As illustrated in FIG. 4D, the side horizontal cross-sectional thickness of the actuator 50 along its lower edge $T_L$ can be substantially greater than the side horizontal cross-sectional thickness along its upper edge $T_U$ to provide additional cantilevered mass in a region generally opposite from where the actuation force is applied to facilitate activation of the actuator 50.

It is contemplated that the overall dimensions of the trash can 1 can vary considerably. For example, the height H1 can have a broad range. In some embodiments, the height H1 can be greater than about six inches and/or less than or equal to about four feet. In some embodiments, the height H1 can be approximately three feet. Many variations are possible. Furthermore, the height H2 of the cap portion 4 can vary greatly. In some embodiments, the height H2 can be less than about one foot and/or greater than or equal to about one inch. In some embodiments, the height H2 can be about three and one half inches. Many variations are possible. The width W and depth D of the trash can and/or the cap portion 4 can also vary considerably. In some embodiments, the width W of the body 2 is greater than the width W of the cap portion 4. In some embodiments, the width W of the body 2 is less than or about the same as the width W of the cap portion 4. In some embodiments, the depth D of the body 2 is greater than the depth D of the cap portion 4. In some embodiments, the depth D of the body 2 is less than or about the same as the depth D of the cap portion 4. In some variations, the depth D of body 2 and/or the cap portion 4 can be greater than about five inches and/or less than about two feet. In some embodiments, the depth D of the body 2 and/or the cap portion 4 can be approximately one foot. In some variations, the width W of body 2 and/or the cap portion 4 can be greater than about eight inches and/or less than about three feet. In some embodiments, the width W of the body 2 and/or the cap portion 4 can be approximately fourteen inches. Many variations of the width W and depth D of the body 2 and cap portion 4 are possible.

Figure 2A:
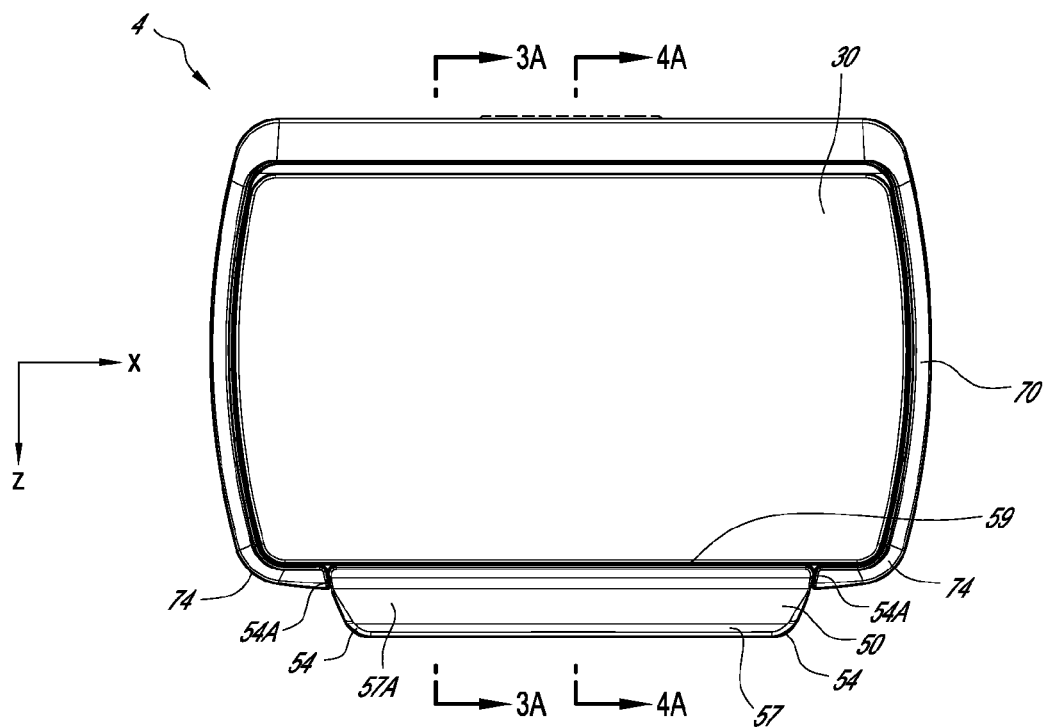
FIG. 2A is a top view of the cap portion of the trash can of FIG. 1.
Figure 2B:
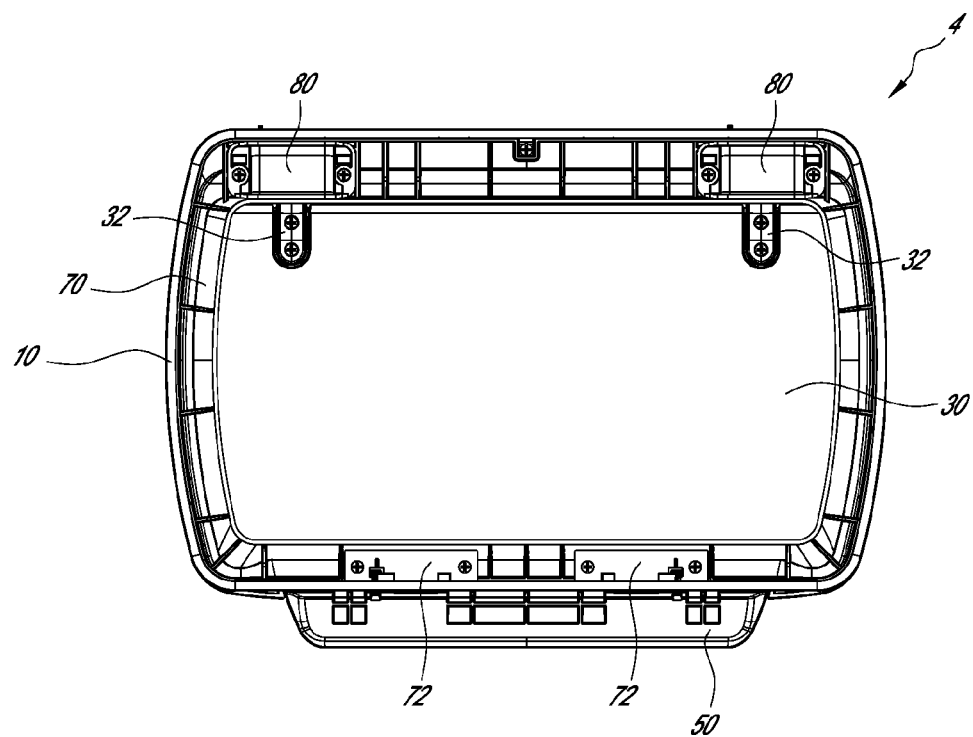
FIG. 2B is a bottom view of the cap portion of FIG. 2A.

As illustrated in FIGS. 2A and 2B, the cap portion 4 can have a substantially rectangular shape. In some embodiments, the cap portion 4 can have a generally oval shape, generally circular shape, generally semi-round shape, generally triangular shape, or any other appropriate shape for a trash can. The lid 30 can have the same or a substantially similar shape as the cap portion 4. In some embodiments, the lid 30 has a substantially different shape from the overall shape of the cap portion 4. In some embodiments, the actuator 50 can extend outwardly from the frame member 10, as illustrated in FIG. 2B. In some embodiments, the actuator 50 extends outwardly from the peripheral portion 70 of the cap portion 4, as illustrated in FIG. 2A. In some embodiments, the peripheral portion 70 can extend outwardly in the vicinity of the actuator 50 such that the outer edge 57 of the actuator 50 and the outer edge of the peripheral portion 70 form a substantially continuous line or curve. For example, the peripheral portion 70 can extend from the points 74 near the front corners of the peripheral portion 70 to the points 54 near the front corners of the actuator 50. As shown, the front corners of the actuator 50 can be generally contoured or generally rounded. In some embodiments, the outer edge 57 of the actuator 50 can form a substantially straight edge. In some embodiments, the outer edge 57 of the actuator 50 can form a curved edge. In some embodiments, the outer edge 57 of the actuator can include surface features (e.g., dimples, high-friction features, projections, grooves, or any other surface feature). As illustrated in FIG. 2A, the outer width of the actuator 50 on the side that is closer to the user and further from the trash receptacle (e.g., the distance between points 54) can be different from the inner width of the actuator 50 on the side that is further from the user and closer to the trash receptacle (e.g. the distance between points 54A). For example, as illustrated, the outer width can be smaller than the inner width. The actuator 50 can taper inwardly and/or downwardly from the inner width to the outer width.

In some embodiments, the cap portion 4 can include one or more lid hinge assemblies 80 located on the side of the cap portion 4 generally opposite the actuator 50. In some embodiments, the cap portion 4 includes more than two lid hinge assemblies 80. In some embodiments, the lid hinge assemblies 80 are the same as or substantially similar to each other functionally and/or structurally. In some embodiments, the lid hinge assemblies 80 are functionally and/or structurally distinct from each other. In some embodiments, the peripheral portion 70 can include one or more actuator hinge assemblies 72 located on the side of the peripheral portion 70 adjacent the actuator 50. In some embodiments, the peripheral portion 70 includes more than two actuator hinge assemblies 72. In some embodiments, the actuator hinge assemblies 72 are the same as or substantially similar to each other functionally and/or structurally. The actuator hinge assemblies 72 can be configured to rotationally couple with the actuator 50.

In some embodiments, the lid 30 can include one or more lid hinge attachments 32 attached to the rear bottom side of the lid 30. The lid hinge attachments 32 can be attached to the lid 30 via fasteners (e.g., screws, bolts), adhesives, or any other appropriate attachment method. In some embodiments, the lid 30 includes more than two lid hinge attachments 32. In some embodiments, the lid hinge attachments 32 are the same as or substantially similar to each other functionally and/or structurally. In some embodiments, the lid hinge attachments 32 are functionally and/or structurally distinct from each other. The lid hinge attachments 32 can be configured to rotationally attach to the lid hinge assemblies 80 to allow rotation of the lid 30 with respect to the cap portion 4, as will be described in more detail below.

Figure 2D:
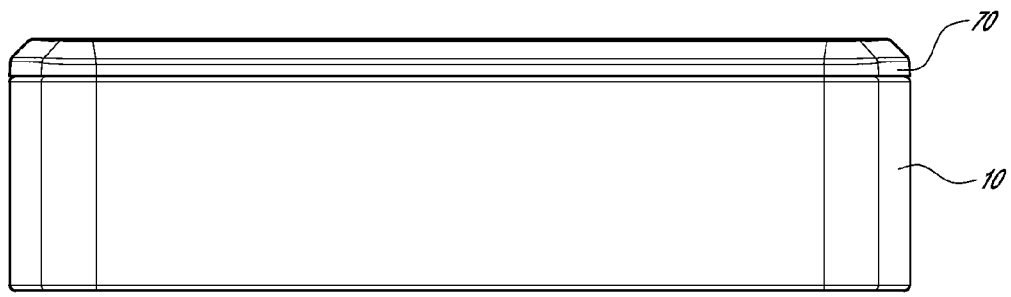
FIG. 2D is a front view of the cap portion of FIG. 2A.
Figure 2C:
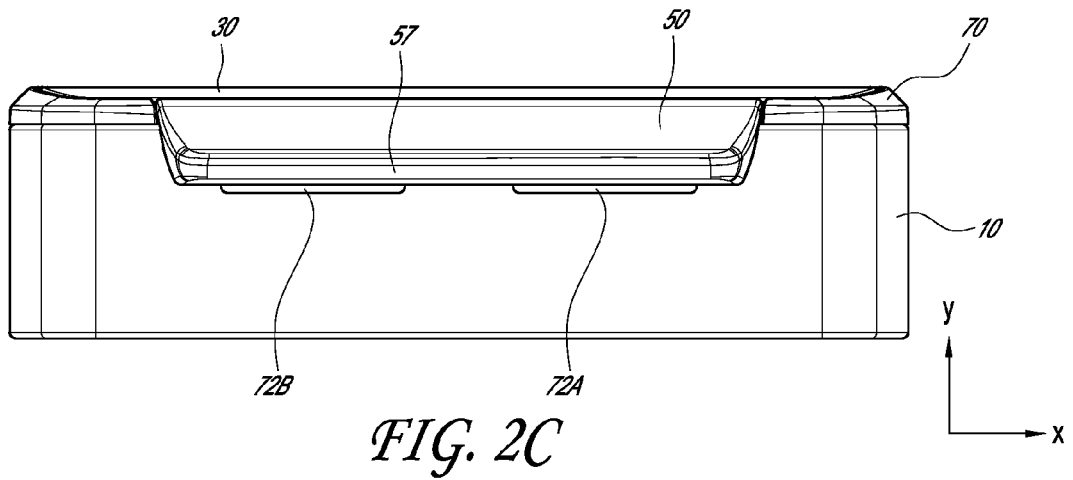
FIG. 2C is a rear view of the cap portion of FIG. 2A.
Figure 2E:
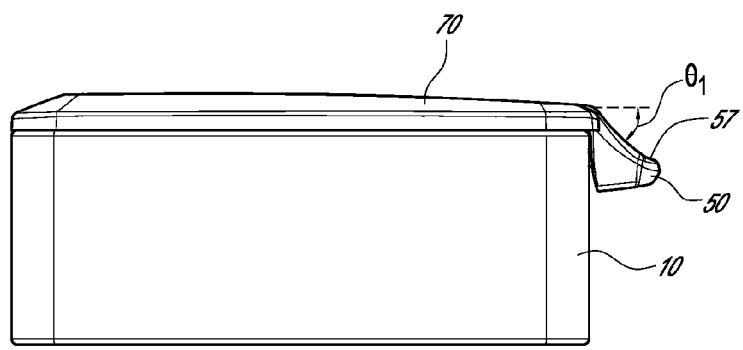
FIG. 2E is a left side view of the cap portion of FIG. 2A.

As illustrated in FIGS. 2C-2E, the lid 30 can be configured to have a low profile with respect to the peripheral portion 70 when the lid 30 is in a closed configuration. For example, the upper surface of the lid 30 can be generally flush with the upper surface of the peripheral portion 70. In some embodiments, the vertical distance between the upper surface of the lid 30 and the upper surface of the peripheral portion 70 can be approximately less than or equal to the width of the upper edge of the peripheral portion 70. As shown in FIGS. 2C and 2E, the lid 30 and/or peripheral portion 70 can be configured in some embodiments to substantially "hide" the lid 30 from behind and/or from the sides of the trash can 1. In some embodiments, the lid 30 is configured to have a more prominent profile than that illustrated in FIGS. 2C-2E.

Figure 3A:
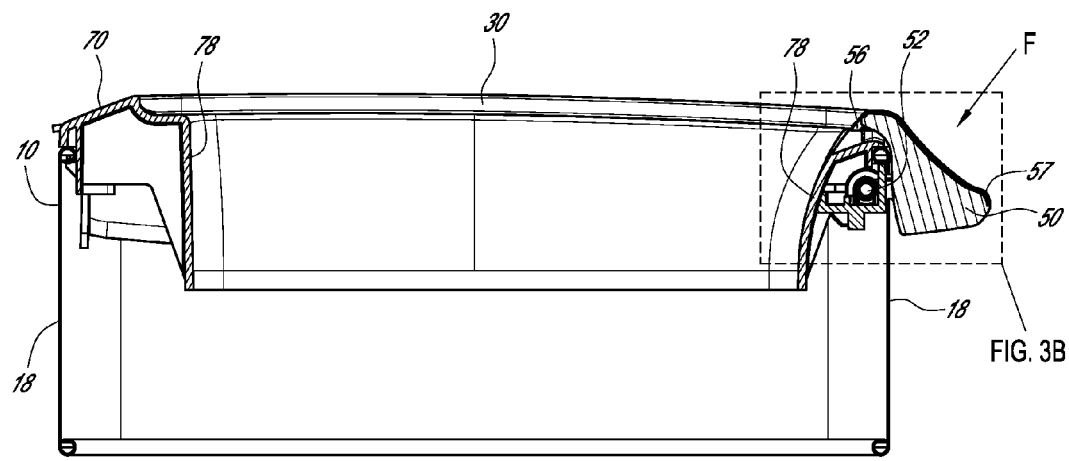
FIG. 3A is a cross-section view of the cap portion of FIG. 2A along the section plane 3A-3A of FIG. 2A.

In some embodiments, as illustrated in FIG. 3A, the frame member 10 can include an outer shroud 18 extending downward from the lid 30. In some embodiments, the outer shroud 18 can be configured to engage with the top of the body, such as a bin 2. In some embodiments, the outer shroud 18 can include internal and/or external features that can be configured to facilitate locking the cap portion 4 onto the top of the bin 2. In certain embodiments, the outer shroud 18 can be formed of metal, such as stainless steel, and the lower portion of the shroud 18 can be rolled inward. The rolled portion of the outer shrouding 18 can engage with features, such as hooks or recesses, on top portion of the bin 2 to removably lock the frame member 10 with the bin 2. In some embodiments, the outer shroud 18 can have substantially the same cross section as the cross section of the top of the bin 2. In some embodiments, the peripheral portion 70 can include an inner shroud 78 extending downward from the lid 30. In some embodiments, the inner shroud 78 is located within the outer shroud 18. In some embodiments, the inner shroud 78 can be configured to help guide trash or other objects into the bin 2.

In some embodiments, the actuator 50 can extend outwardly from the peripheral portion 70 and/or the frame member 10. In some embodiments, the actuator 50 can extend outwardly from the peripheral portion 70 and/or the frame member 10 and downward at an angle θ1 from level with the ground, as illustrated in FIG. 2E. In some embodiments, the angle θ1 of the actuator 50 can be greater than or equal to about 5° and/or less than or equal to about 85°. In some embodiments, the angle θ1 of the actuator 50 can be about 45°. In some embodiments, the lowest portion (e.g., the portion closest to the ground) of the actuator 50 is located above (e.g., further away from the ground than) the lowest portion of the frame member 10.

Figure 3B:
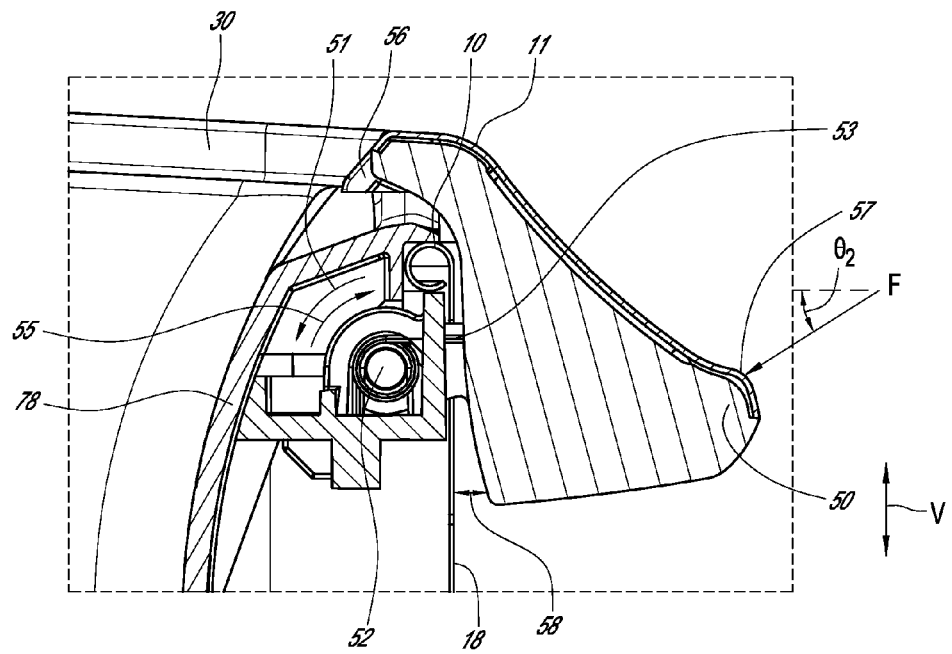
FIG. 3B is a close-up view of the portion identified in FIG. 3A.

As illustrated in FIG. 3B, the actuator 50 can include a hinge member 52 about which the actuator 50 can rotate. In some embodiments, the actuator 50 can be biased in a first direction of rotation 51 about the hinge member 52. The aforementioned biasing force can, in some embodiments, be provided by biasing member, such as a torsional spring 53 or other source of rotational bias. In some embodiments, the actuator 50 can be inhibited from rotating in the first direction 51 beyond a closed position (e.g., the position illustrated in FIGS. 2E and 3D). In some embodiments, the actuator 50 can be configured to reach a closed position when a portion of the actuator 50 comes into contact with the peripheral portion 70 and/or the frame member 10. In some embodiments, the actuator 50 can be configured to reach a closed position when the torsional spring 53 or other source of rotational bias reaches a resting position (e.g., when the torsional spring 53 or other source of rotational bias is under a reduced amount of tension or compression). As shown in FIG. 3B, in some embodiments, the width of the generally sloping portion of the actuator (e.g., from its upper edge 11 to its outer edge 57) is substantially greater than the width V of a generally vertical front or outer portion. In some embodiments, the actuator is solid or generally solid.

In some embodiments, the actuator 50 can be configured to rotate about the hinge member 52 in a second direction 55 in response to a force F applied at or near the outer edge 57 of the actuator 50. In some embodiments, the actuator 50 can be configured to rotate in the second direction 55 in response to the force F applied over a range of effective angles θ2, as illustrated in FIG. 3B. In some embodiments, the force F can effect movement of the actuator 50 in the second direction 55 when the angle θ2 is greater than about 0° and/or less than about 110°. In some embodiments, the force F can effect movement of the actuator 50 in the second direction 55 when the angle θ2 is greater than about 60° and/or less than or equal to about 90°. In some embodiments, the range of rotation of the actuator 50 in the second direction 55 can be limited to a range of motion defined by the space 58 between the lower portion of the actuator 50 and the frame member 10 and/or peripheral portion 70. In some embodiments, the range of rotation of the actuator 50 in the second direction can be limited by the twisting range of the torsional spring 53 or other source of rotational bias.

FIGS. 4A-4E illustrate opening the lid 30 and gaining access to the interior of the trash can 1. In some embodiments, the actuator 50 can include a locking portion, such as a flange 56. The locking portion can be configured to engage with a securing portion, such as a recess 36, of the lid 30. In some embodiments, the locking portion comprises a recess in the actuator 50 and the securing portion comprises a flange in the lid 30. In some embodiments, the flange 56 can have a sloped portion 56A. Other methods of engagement between the lid 30 and the actuator 50 are contemplated, such as magnets or other appropriate securing methods.

In some embodiments, the flange 56 of the actuator 50 can be configured to engage with the recess 36 of the lid 30 when the lid 30 is in a closed configuration and the actuator 50 is in a resting position. As illustrated in FIG. 4B, the flange 56 can be configured to engage with a lip 37 in the recess 36 of the lid 30. Engagement between the flange 56 and the lip 37 can inhibit the lid 30 from transitioning to the open configuration. In some embodiments, the flange 56 can be removed from the recess 36 and can disengage the lip 37, such as upon rotation of the actuator 50 in the second direction 55 to an open position, as illustrated in FIG. 4C. In some embodiments, the actuator 50 can be configured to rotate to the open position in reaction to the input force F. In some embodiments, the space 58 between the actuator 50 and the frame member 10 can be reduced when the actuator 50 is in the open position.

According to some configurations, the lid 30 can be rotationally biased toward the open configuration (e.g., to rotate away from the actuator 50 to an opened configuration), as will be described in more detail below. In some embodiments, disengagement of the flange 56 from the lip 37 can allow the lid 30 to move in a direction 35 away from the actuator 50. For example, in the embodiment illustrated in FIGS. 4A-4E, the lid rotates counterclockwise to achieve the open configuration.

As illustrated in FIG. 4E, the lid 30 can rotate away from the actuator 50 such that an angle θ3 is formed between the lid 30 and the peripheral portion 70 and/or frame member 10. In some embodiments, the angle θ3 between the lid 30 and the peripheral portion 70 and/or frame member 10 when the lid 30 is in a fully opened configuration can be greater than about or equal to 15° and/or less than equal to about 160°. In some embodiments, the angle θ3 is approximately 90° when the lid 30 is in an open configuration.

In some embodiments, the lid 30 can be returned to a closed configuration by rotating the lid 30 toward the actuator 50 (e.g., clockwise in the embodiment of FIGS. 4A-4E) until the flange 56 engages with lip 37 and/or recess 36 in the lid 30. In some embodiments, as the lid 30 comes into contact with the flange 56, the lower side of the front edge 39 of the lid 30 can contact the sloped portion 56A of the flange 56. As the lower side of the front edge 39 is pushed onto the sloped portion 56A of the flange 56, the force on the sloped portion 56A can be translated to a torsional force about the hinge member 52 of the actuator and can cause the actuator 50 to rotate in the second direction 55, as illustrated in FIG. 3B. The front edge 39 can be rounded or sloped such that the flange 56 is easily guided to engage with the lip 37 when the lid 30 is rotating towards the closed position. In some embodiments, the actuator 50 can be configured to rotate (e.g., in the second direction 55) in response to the force applied by the lid 30 until the lower side of the front edge 39 passes the tip of the flange 56. After this passage takes place, the bias of the biasing element (e.g., the torsional spring 53) can rotate the flange 56 in the first direction 51, thereby moving the flange 56 into engagement with the recess 36 such that the actuator 50 reaches its closed position.

In some embodiments, the securing member comprises the flange 56, which can have a sloped lower edge. In some embodiments, the locking portion comprises the recess 36. In some embodiments, the actuator includes the securing member and the lid 30 includes the locking portion. In certain variants, is the actuator includes the locking portion and the lid 30 includes the securing member. In some implementations, engagement between the sloped lower edge of the flange on the lid 30 and the upper edge of the actuator 50 can result rotation of actuator 50 in the second direction 55 until the sloped flange enters the recess in the actuator 50. Upon entry of the sloped flange into the recess, the actuator 50 can rotate in the first direction 51 until the actuator reaches its closed position. In some embodiments, subsequent rotation of the actuator 50 in the second direction 55 can release the sloped flange of the lid 30 and allow the lid 30 to rotate to an open configuration.

As described earlier, the actuator 50 can be configured to rotate in the first direction 51 to an open position in response to an input force F. Furthermore, the effective range of angles θ2 (e.g., the angles of force F which can cause the actuator 50 to rotate in the first direction 51) for the force F can be quite broad. In some embodiments, broad range of effective angles θ2 can increase the ease with which the actuator 50 can be transitioned to an open position. Increasing the ease with which the actuator 50 can be transitioned to an open position can increase the ease with which a user can open the lid 30. For example, in some embodiments, a user of the trash can 1 can open the lid 30 by using a hip, leg, knee, foot, or other object or body part to apply the force F with a relatively low angle θ2 on the actuator 50. In some configurations, the user can use a hand or other object or body part to push down on the actuator 50 with a relatively high angle (e.g., greater than about 60° and/or less than or equal to about 120°) θ2 of force F to open the lid 30.

FIGS. 5A-5G provide further illustration of the lid 30. As noted earlier, in some embodiments, the lid 30 can include one or more lid hinge attachments 32 located at or near the rear end of the lid 30. In some embodiments, the one or more lid hinge attachments 32 can include a rotation assembly 40. The rotation assembly 40 can include a rotation point 42 about which the lid 30 can be configured to rotate. In some embodiments, the one or more rotation assemblies 40 can include one or more surface features 49 that can be configured to engage with engagement features 89 of the lid hinge assemblies 80, as described below. In some embodiments, the rotation assemblies 40 can include stabilization portions 44, 45. In some embodiments, the rotation assemblies 40 can include bias engagement portions. In some embodiments, as illustrated, the bias engagement portions can comprise spring engagement ports 47.

Figure 6A:
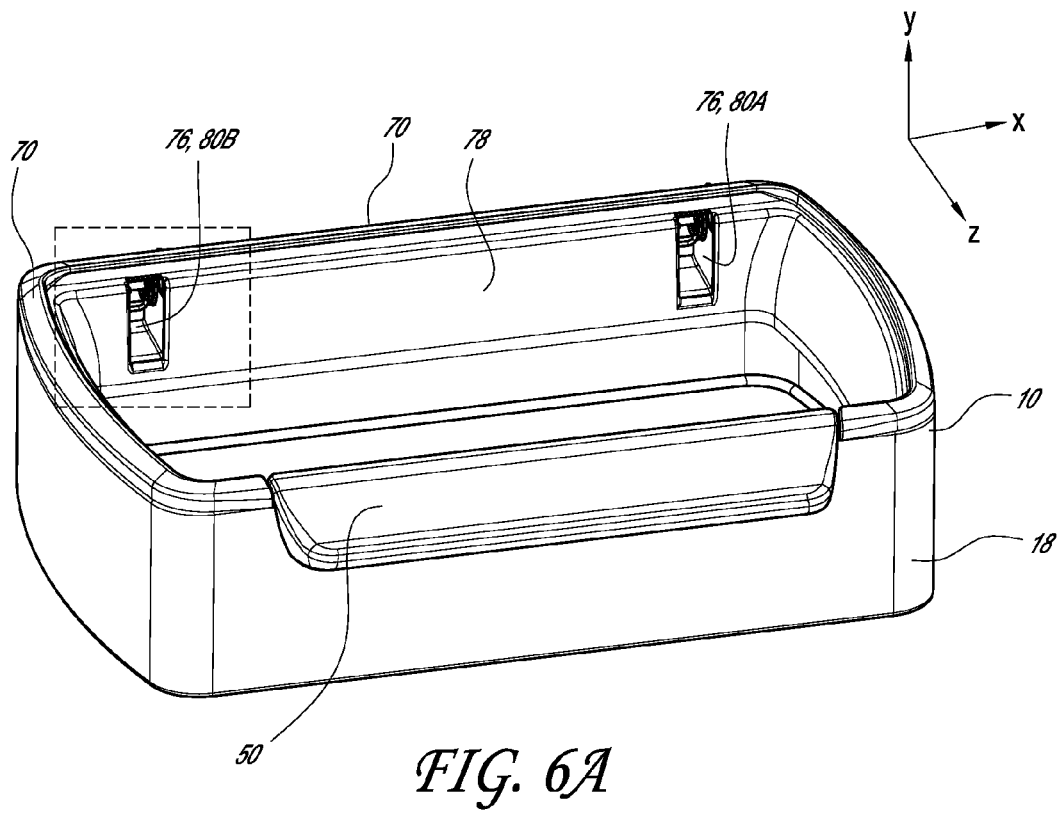
FIG. 6A is a front left perspective view of the cap portion of FIG. 2A with the lid removed.
Figure 6B:
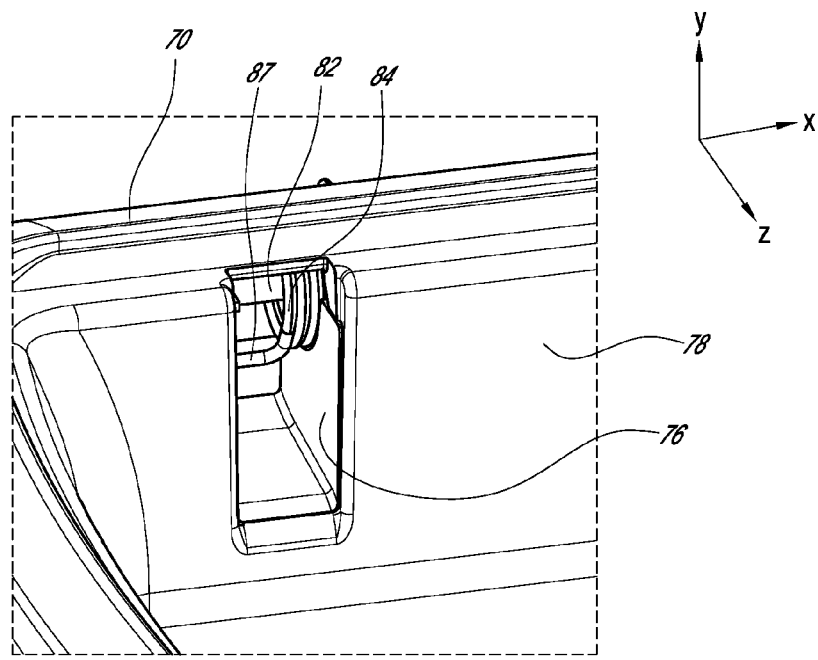
FIG. 6B is a close-up front left perspective view of the cap portion of FIG. 2A, as defined by the portion identified in FIG. 6A.
Figure 6C:
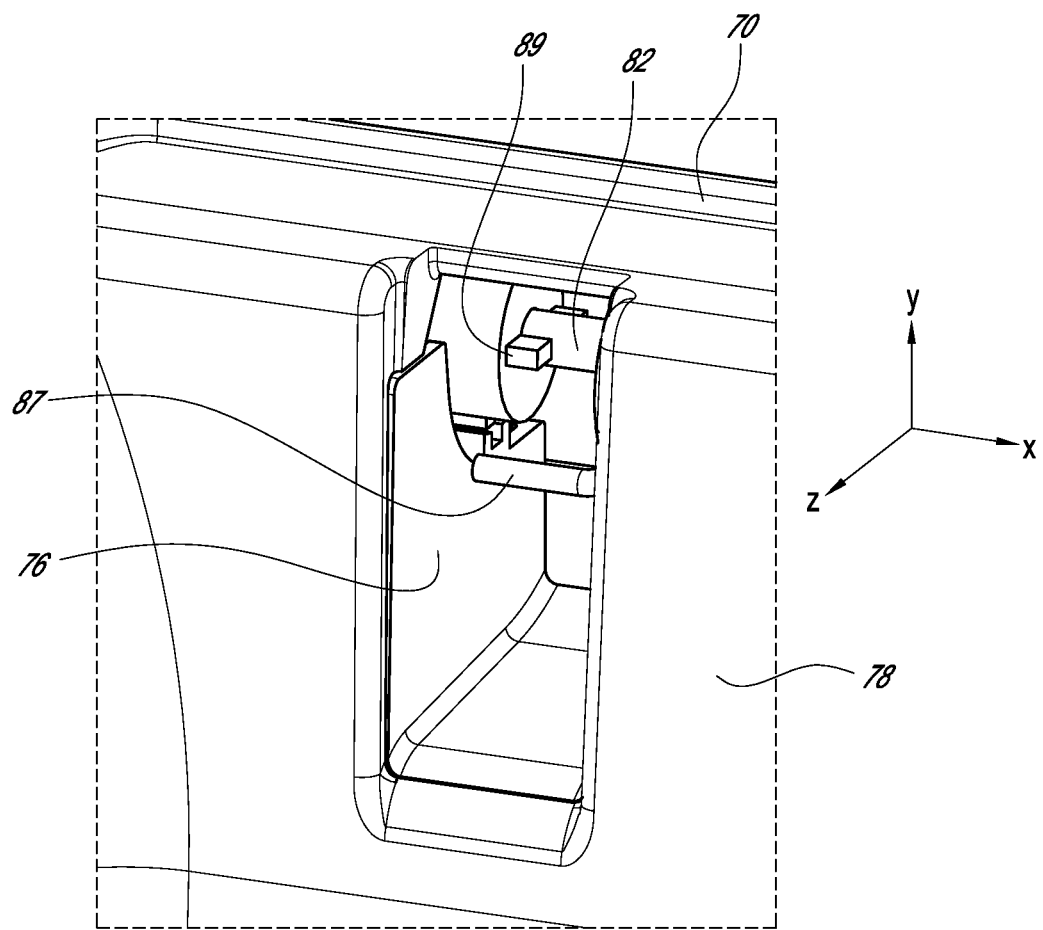
FIG. 6C is a close-up front right perspective view of the cap portion of FIG. 2A, as defined by the portion identified in FIG. 6A.

As illustrated in FIGS. 6A-6C, the peripheral portion 70 and/or frame member 10 can include one or more lid engagement cavities 76. In some embodiments, the lid engagement cavities 76 can be configured to receive the one or more lid hinge attachments 32. In some embodiments, portions of or the entire lid hinge assemblies 80 can be housed within the one or more lid engagement cavities 76. In some embodiments, the lid hinge assemblies 80 can include a lid-biasing member. In some embodiments, the lid-biasing member can comprise a torsion spring 84 or some other appropriate source of rotational bias. The torsion spring 84 can include a rotation assembly engagement portion 87. In some embodiments, the engagement portions 87 can be configured to engage with the spring engagement ports 47. In some embodiments, the torsion spring 84 can be configured to bias the lid 30 to an open position.

As illustrated in FIG. 6C, the lid hinge assemblies 80 can include one or more engagement features 89. The engagement features 89 can be configured to engage with the one or more surface features 49 of the rotation assemblies 40. In some embodiments, the lid hinge assemblies 80 can include hinge members 82. The hinge members 82 can be configured to rotationally engage with the rotation points 42 of the rotation assemblies 40. In some embodiments, the rotation assemblies 40 and/or the lid hinge assemblies 80 can include one or more damping members 90. In some embodiments, the one or more damping members 90 can comprise rotary dampers, hydraulic dampers, frictional dampers, or some other appropriate mechanism for damping the rotation of the lid 30. In some embodiments, the damping members 90 can help to facilitate a slow and/or steady opening and/or closing of the lid 30. The damping members 90 inhibit sudden or fast opening of the lid 30 that can result in rocking of the trash can 1. The damping members 90 also can reduce stress on the lid 30, as the lid 30 open slowly or gradually and not contact any surfaces within the trash can 1 or walls with great force.

Although the trash can has been disclosed in the context of certain embodiments and examples, those skilled in the art will understand that the present disclosure extends beyond the specifically disclosed embodiments to other alternative embodiments and/or uses of the trash can and obvious modifications and equivalents thereof. In addition, while several variations of the trash can have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes or embodiments of the trash can. Thus, it is intended that the scope of the present disclosure should not be limited by the particular disclosed embodiments described above.

The following is claimed:

1. A refuse storage receptacle comprising:
    a body comprising an interior cavity, a front face, and at least one opening located on a top portion of the body; and
    a lid portion configured to engage with the top portion of the body, the lid portion comprising:
        a cap having an upper portion and a lower portion, the lower portion configured to engage with the body, the cap having an opening configured to allow refuse to pass through the cap and into to the interior cavity of the body, the cap forming an outer periphery of at least a portion of the receptacle;
        a lid rotationally connected to the cap in a region of the opening, the lid having a shape that generally corresponds to a shape of the opening in the cap, the lid comprising at least one hinge attachment member on a first side of the lid and a securement member on a second side of the lid generally opposite the first side, the at least one hinge attachment member configured to connect to one or more lid engagement members of the cap, the lid configured to transition between an opened configuration and a closed configuration, wherein the lid inhibits access to the opening in the cap when the lid is in a closed configuration;
        an actuator configured to rotate between an open position and a closed position, wherein:
            in the open position, the actuator is rotationally connected to the cap and extends outwardly and downwardly from an outer edge of the cap,
            in the closed position, an outer edge of the actuator extends in front of the front face of the body; and
            the actuator is rotationally biased toward the closed position; and
        a locking member configured to engage with the securement member of the lid when the actuator is in the closed position such that the locking member secures the lid in the closed configuration and inhibits the lid from moving to the open configuration, the engagement of the locking member and the securement member being released upon application of a downward input force at an effective angle upon the actuator, thereby allowing the lid to move to the open configuration.

2. The receptacle of claim 1, wherein the locking member comprises a flange with a sloped upper edge configured to deflect the actuator.

3. The receptacle of claim 2, wherein the securement member comprises a recess, the recess configured to receive the flange when the lid is in a closed configuration and the locking member is in a closed position.

4. The receptacle of claim 1, wherein the securement member comprises a flange with a sloped lower edge configured to engage and deflect the actuator.

5. The receptacle of claim 1, wherein the effective angle of the downward input force, relative to generally flat horizontal ground, is between about 60° and about 90°.

6. The receptacle of claim 1, wherein the cap further comprises at least one torsion spring configured to engage with at least one of the one or more lid engagement members and to rotationally bias the lid toward the open configuration.

7. The receptacle of claim 1, wherein the cap further comprises at least one biasing member configured to engage with the actuator and to rotationally bias the actuator toward the closed position.

8. The receptacle of claim 1, wherein the cap has a generally rectangular shape.

9. The receptacle of claim 1, wherein the lid is rotationally connected to one side of the opening of the cap.

10. The receptacle of claim 1, wherein the lid is rotationally biased toward the open configuration.

11. The receptacle of claim 1, wherein the actuator comprises an inner edge on the side of the actuator adjacent the cap and a hinge member about which the actuator can rotate.

12. The receptacle of claim 1, wherein the outer edge of the actuator and the outer edge of the cap form a substantially continuous curve.

13. The receptacle of claim 11, wherein the outer edge of the actuator is longer than the inner edge of the actuator.

14. The receptacle of claim 11, wherein the inner edge of the actuator is longer than the outer edge of the actuator.

15. The receptacle of claim 11, wherein the inner edge of the actuator is substantially a same length as the outer edge of the actuator.

16. The receptacle of claim 1, wherein the lid portion further comprises one or more damping members configured to slow down and diminish a momentum, thereby smoothing the transition of the lid between the open configuration and the closed configuration and diminishing noise and reverberation during closure.

17. The receptacle of claim 1, wherein when the receptacle is positioned on generally flat ground in a normal configuration for use, a distance between a lowest point on the actuator and the ground is greater than the distance between the ground and the lower portion of the cap.

18. The receptacle of claim 1, wherein the cap further comprises an inner shroud extending downward from the lid, the inner shroud being configured to guide trash or other articles from a peripheral aperture into the interior cavity of the body.

19. The receptacle of claim 1, wherein a frame member further comprises an outer shroud extending downward from the upper portion of the cap, the outer shroud being configured to inhibit access from a side of the lid portion to the interior cavity of the body.

20. The receptacle of claim 1, wherein, in the open position, the actuator is disposed downwardly at about a 45° angle with respect to generally flat ground.

21. A refuse storage receptacle comprising:
a body comprising an interior cavity, a front face, and at least one opening located on a top portion of the body; and
a lid portion configured to engage with the top portion of the body, the lid portion comprising:
a cap having an upper portion and a lower portion, the lower portion configured to engage with the body, the cap having an opening configured to allow refuse to pass through the cap and into to the interior cavity of the body, the cap forming an outer periphery of at least a portion of the receptacle;
a lid rotationally connected to the opening of the cap, the lid comprising a securement member, the lid configured to transition between an opened configuration and a closed configuration, wherein the lid inhibits access to the opening in the cap when the lid is in a closed configuration; and
an actuator configured to rotate between an open position and a closed position, wherein:
in the open position, the actuator is rotationally connected to the cap and spaced apart from the lid,
in the closed position, an outer edge of the actuator extends in front of the front face of the body, and
the actuator is rotationally biased toward the closed position;
the actuator comprising a locking member configured to releasably engage with the securement member of the lid when the actuator is in the closed position such that the locking member secures the lid in the closed configuration and inhibits the lid from moving to the open configuration;
wherein the engagement of the locking member and the securement member is released upon application of a downward force upon the actuator to move the actuator to the open position;
wherein the securement member deflects the actuator from the closed position toward the open position during a portion of the movement of the lid from the open configuration to the closed configuration.

22. The receptacle of claim 21, wherein the lid is rotationally biased toward the open configuration.

23. The receptacle of claim 21, wherein the cap further comprises at least one biasing member configured to engage with the actuator and to rotationally bias the actuator toward the closed position.

24. The receptacle of claim 21, wherein the locking member comprises a flange with a sloped upper edge configured to deflect the actuator.

25. The receptacle of claim 24, wherein the securement member comprises a recess, the recess configured to receive the flange when the lid is in a closed configuration and the locking member is in a closed position.

26. The receptacle of claim 21, wherein the securement member comprises a flange with a sloped lower edge configured to engage and deflect the actuator.

27. The receptacle of claim 26, wherein the locking member comprises a recess, the recess configured to receive the flange when the lid is in a closed configuration and the locking member is in a closed position.

28. A method of opening and closing a lid of a refuse receptacle having a body, a cap, the lid, and an actuator, the method comprising:
rotating the actuator from a closed position to an open position, the actuator being rotationally connected to the cap and extending outwardly and downwardly from an outer edge of the cap in the open position;
releasing a locking member of the actuator from engagement with a securement member of the lid, an outer edge of the actuator extending in front of a front face of the body when the actuator is in the closed position;
allowing the lid to rotate from a closed configuration to an open configuration;
releasing the actuator;
allowing the actuator to return to the closed position;
rotating the lid from the open configuration toward the closed configuration;
deflecting the actuator from the closed position toward the open position with the lid; and engaging the securement member and the locking member, thereby allowing the actuator to return to the closed position and inhibiting the lid from moving toward the open position.

29. A method of manufacturing a refuse storage receptacle comprising:

engaging a lower portion of a cap with a body, the cap having an opening configured to allow refuse to pass through the cap and into an interior cavity of the body, the cap forming an outer periphery of at least a portion of the receptacle;

connecting a lid to the cap in a region of the opening, the lid having a shape that generally corresponds to the shape of the opening in the cap, the lid comprising at least one hinge attachment member on a first side of the lid and a securement member on a second side of the lid generally opposite the first side;

connecting the at least one hinge attachment member to one or more lid engagement members of the cap, the lid configured to transition between an opened configuration and a closed configuration, wherein the lid inhibits access to the opening in the cap when the lid is in a closed configuration;

connecting an actuator to the cap, the actuator configured to rotate between an open position and a closed position, wherein:
  in the open position, the actuator is connected with the cap and extends outwardly and downwardly from an outer edge of the cap,
  in the closed position, an outer edge of the actuator extends in front of a front face of the body, and
  the actuator is rotationally biased toward the closed position; and engaging a locking member with the securement member of the lid when the actuator is in the closed position such that the locking member secures the lid in the closed configuration and inhibits the lid from moving to the open configuration, the engagement of the locking member and the securement member being released upon application of a downward input force at an effective angle upon the actuator, thereby allowing the lid to move to the open configuration.

30. The receptacle of claim 21, wherein, in the open position, the actuator extends outwardly and downwardly from an outer edge of the cap.

* * * * *